(12) United States Patent
Shiraki et al.

(10) Patent No.: US 7,697,775 B2
(45) Date of Patent: Apr. 13, 2010

(54) IMAGE SIGNAL PROCESSING APPARATUS AND METHOD, AND PROGRAM AND RECORDING MEDIUM USED THEREWITH

(75) Inventors: Hisakazu Shiraki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1205 days.

(21) Appl. No.: 10/915,318

(22) Filed: Aug. 11, 2004

(65) Prior Publication Data
US 2005/0104970 A1    May 19, 2005

Related U.S. Application Data

(63) Continuation-in-part of application No. 10/909,559, filed on Aug. 3, 2004, now abandoned.

(30) Foreign Application Priority Data

Aug. 11, 2003    (JP) .............................. 2003-291407

(51) Int. Cl.
    *G06K 9/40*    (2006.01)
(52) U.S. Cl. ...................... 382/254; 382/255; 382/260; 382/261
(58) Field of Classification Search ................. 382/254, 382/255, 264–266, 275
    See application file for complete search history.

(56) References Cited

U.S. PATENT DOCUMENTS 6,154,574 A * 11/2000 Paik et al. .................. 382/255
6,901,173 B2 * 5/2005 Alderson et al. ............ 382/312
6,959,117 B2 * 10/2005 Ratner et al. ............... 382/255
7,187,785 B2 * 3/2007 Ikeda et al. ................. 382/115
2003/0031375 A1 * 2/2003 Enomoto .................... 382/255
2004/0190788 A1 * 9/2004 Imafuku et al. ............. 382/261
2005/0281477 A1 * 12/2005 Shiraki et al. ............... 382/255

FOREIGN PATENT DOCUMENTS

JP    03-172082    7/1991
JP    11-027574    1/1999

* cited by examiner

*Primary Examiner*—Bhavesh M Mehta
*Assistant Examiner*—Eric Rush
(74) *Attorney, Agent, or Firm*—Oblon, Spivak, McClelland, Maier & Neustadt, L.L.P.

(57) ABSTRACT

An image signal processing apparatus and method perform appropriate correction of image blurring in accordance with an image characteristic. In the apparatus, a user interface designates a blurring parameter, and a control signal generating unit generates a control signal corresponding to the designated parameter. An image characteristic detecting unit determines directions in which pixels in an input image have flat levels and directions in which pixels in the input image have levels corresponding to edges. Based on the determination, an address calculating unit reads coefficients from a coefficient ROM and supplies the coefficients to a product-sum calculating unit. The product-sum calculating unit generates a blurring-eliminated image by performing product-sum calculation using the coefficients. A post-processing unit produces an output image based on the input image and the result of product-sum calculation.

20 Claims, 28 Drawing Sheets

FIG. 4

| NAME | RELATED BLOCK | MEANING | INTERFACE IN USE |
|---|---|---|---|
| CONTROL SIGNAL A | POST-PROCESSING UNIT, REGION EXTRACTING UNIT | PULSE SIGNAL SPECIFYING REGION TO BE PROCESSED | JOYSTICK |
| CONTROL SIGNAL B | ADDRESS CALCULATING UNIT | PARAMETER REPRESENTING BLURRING | SW1 |
| CONTROL SIGNAL C | ADDRESS CALCULATING UNIT | SWITCHING WEIGHT $W_a$ IN EXPRESSION | SW2 |
| CONTROL SIGNAL D | IMAGE CHARACTERISTIC DETECTING UNIT | THRESHOLD VALUE SWITCHING | SW3 |
| CONTROL SIGNAL E | POST-PROCESSING UNIT | THRESHOLD VALUE SWITCHING | SW4 |
| CONTROL SIGNAL F | POST-PROCESSING UNIT | OUTPUT SWITCHING | BUTTON |

FIG. 14

| PARAMETER CODE $p_2$ | $W_1$ | $W_2$ | $W_3$ | $W_4$ |
|---|---|---|---|---|
| 0001 | 0.1 | 0.1 | 0.1 | 5.4 |
| 0010 | 0.1 | 0.1 | 5.4 | 0.1 |
| 0100 | 0.1 | 5.4 | 0.1 | 0.1 |
| 1000 | 5.4 | 0.1 | 0.1 | 0.1 |
| 0011 | 0.1 | 0.1 | 2.6 | 2.6 |
| 0101 | 0.1 | 2.6 | 0.1 | 2.6 |
| 0110 | 0.1 | 2.6 | 2.6 | 0.1 |
| 1001 | 2.6 | 0.1 | 0.1 | 2.6 |
| 1010 | 2.6 | 0.1 | 2.6 | 0.1 |
| 1100 | 2.6 | 2.6 | 0.1 | 0.1 |
| 0111 | 0.3 | 1.7 | 1.7 | 1.7 |
| 1011 | 1.7 | 0.3 | 1.7 | 1.7 |
| 1101 | 1.7 | 1.7 | 0.3 | 1.7 |
| 1110 | 1.7 | 1.7 | 1.7 | 0.3 |
| 1111 | 1.3 | 1.7 | 1.3 | 1.3 |

FIG. 27

| IN-FRAME OUTPUT | | |
|---|---|---|
| | a | FINAL PROCESSING RESULT |
| | b | INPUT IMAGE |
| OUT-OF-FRAME OUTPUT | | |
| | a | PREDETERMINED LEVEL OF ALL PIXELS |
| | b | INPUT IMAGE |
| FRAME OUTPUT | | |
| | a | DISPLAY |
| | b | NO DISPLAY |

IMAGE SIGNAL PROCESSING APPARATUS AND METHOD, AND PROGRAM AND RECORDING MEDIUM USED THEREWITH

CROSS REFERENCE TO RELATED PATENT APPLICATION

The present application is a continuation-in-part (CIP) of, commonly owned co-pending U.S. application Ser. No. 10/909,559, filed on Aug. 3, 2004, having the same title as the present application, the entire contents of which being incorporated herein by reference.

BACKGROUND OF THE INVENTION

1. Field of the Invention

The present invention relates to image signal processing apparatuses and methods, and programs and recording media used therewith, and in particular, to an image signal processing apparatus and method that perform appropriate correction of image blurring in accordance with a characteristic of an image, and a program and recording medium used therewith.

2. Discussion of the Background

In recent years, many digital still cameras each having an automatic focusing function have come into widespread use. The automatic focusing function detects an appropriate focus and performs automatic focusing without user's manual focusing. Although the automatic focusing function enables the user to easily capture images, image capturing may be performed in a state in which, not the original subject whose image to be captured by the user, but the background of the subject is brought into focus. This may consequently cause the image of the original subject to blur.

To correct a picture having a blurred subject image as described above, a technology (see, for example, Japanese Unexamined Patent Application Publication No. 6-68252) in which the image is cleared by performing edge-enhancement sharpening in a blurred portion has been proposed.

In addition, as a method for correcting a picture when considering a blurring model, a technology (see, for example, Japanese Unexamined Patent Application Publication No. 8-272995) in which, when assuming that the pixel levels (observed values) of a captured image are such that the pixel levels (true values) of an image free from blurring are spatially diffused, by writing a model expression between the true values and the observed values and solving the model expression, the true values are estimated from the observed values for image correction.

In the technology disclosed in Japanese Unexamined Patent Application Publication No. 6-68252, a model of blurring caused by shifting in focusing is not considered. Accordingly, information of image details lost due to blurring cannot be reproduced with high fidelity.

In the technology in Japanese Unexamined Patent Application Publication No. 8-272995, the model expression is solved by uniformly setting coefficients concerning portions far from the center of diffusion to be zeroes. When the degree of diffusion is small, the range of diffusion is narrow, and pieces of true-value information concentrates around the center of diffusion. Accordingly, in relation to the uniform setting of the coefficients concerning the portions positioned away from the center of diffusion to be zeroes, no inconsistency occurs. When the degree of blurring is large, even in portions positioned away from the center of diffusion, pieces of true-value information sufficiently exist. Accordingly, by setting the coefficients to be zeroes, inconsistency occurs. In addition, since characteristics of the image are not considered in the case of solving the model expression, in the case of a picture including noise such as JPEG (Joint Photographic Experts Group) noise, there is a possibility that noise may be enhanced to result in deterioration in image. This causes a problem of an inability to appropriately correct the image.

SUMMARY OF THE INVENTION

According to an aspect of the present invention, an image signal processing apparatus for outputting an image signal obtained by processing an input image signal is provided. The image signal processing apparatus includes a designating unit for designating a parameter representing the degree of image blurring, a detecting unit for detecting an image characteristic and outputting a characteristic code representing the detected characteristic, a storage unit for storing a coefficient corresponding to the parameter designated by the designating unit and a coefficient corresponding to the characteristic code output by the detecting unit, a reading unit for reading, from the storage unit, the coefficient corresponding to the parameter designated by the designating unit and the coefficient corresponding to the characteristic code output by the detecting unit, a calculating unit for calculating pixel levels for the levels of pixels of the input image based on the coefficients read by the reading unit, and a selectively-outputting unit for selectively outputting the pixel levels calculated by the calculating unit and the levels of pixels of the input image.

Preferably, based on the coefficients read by the reading unit, the calculating unit performs product-sum calculation for the levels of pixels of the input image.

The characteristic detecting unit may includes a first extracting unit for extracting, from the input image, a plurality of pixels included in a first region around a pixel for which calculation is to be performed, the first region being set beforehand, a second extracting unit for extracting a plurality of pixels included in the first region and a plurality of second regions consecutively positioned in vertical and horizontal directions, a block difference calculating unit for calculating each of a plurality of pixel-level differences between blocks of pixels by calculating the total sum of the absolute values of differences in level of corresponding pixels between the pixels extracted by the first extracting unit and the pixels extracted by the second extracting unit, and a difference comparing unit for determining whether or not each of the calculated differences is greater than a predetermined threshold difference.

Each of the parameters may be a parameter of a Gaussian function in a model expression representing the relationship between pixels of a blurred image and pixels of an unblurred image.

Each of the coefficients stored in the storage unit may be obtained by calculating the inverse matrix of the model expression.

The selectively-outputting unit may include a pixel extracting unit for extracting a plurality of pixels for which calculation is performed by the calculating unit, a dispersion calculating unit for calculating a dispersion representing the degree of dispersion of the pixels extracted by the pixel extracting unit, and a dispersion comparing unit for determining whether or not the dispersion calculated by the dispersion calculating unit is greater than a predetermined threshold dispersion.

The selectively-outputting unit further may further include a pixel selecting unit which, based on the result of determination by the dispersion comparing unit, selects pixel levels to be output from the pixel levels calculated by the calculating unit and the levels of pixels of the input image.

The designating unit may receive a designated output mode representing a manner of displaying an image to be output, and the selectively-outputting unit may further include a switching unit which, based on the output mode, performs switching to the manner of displaying the image to be output.

According to another aspect of the present invention, an image signal processing method for an image signal processing apparatus for outputting an image signal obtained by processing an input image signal is provided. The image signal processing method includes the steps of designating a parameter representing the degree of image blurring, detecting an image characteristic and outputting a characteristic code representing the detected characteristic, reading, from among coefficients stored beforehand, a coefficient corresponding to the parameter designated in the detecting step and a coefficient corresponding to the characteristic code output in the detecting step, calculating pixel levels for the levels of pixels of the input image based on the coefficients read in the reading step, and outputting the pixel levels calculated in the calculating step.

According to another aspect of the present invention, a program used with an image signal processing apparatus for outputting an image signal obtained by processing an input image signal is provided. The program includes the steps of controlling designation of a parameter representing the degree of image blurring, controlling the image signal processing apparatus to detect an image characteristic and to output a characteristic code representing the characteristic, controlling reading, from among coefficients stored beforehand, a coefficient corresponding to the parameter designated in the step of controlling the designation and a coefficient corresponding to the characteristic code output in the step of controlling the detection, controlling the image signal processing apparatus to calculate pixel levels for the levels of pixels of the input image based on the coefficients read in the step of controlling the reading, and controlling the image signal processing apparatus to selectively output the pixel levels calculated in the step of controlling the calculation and the levels of pixels of the input image.

According to another aspect of the present invention, a recording medium having a program recorded thereon is provided, the program being used with an image signal processing apparatus for outputting an image signal obtained by processing an input image signal. The program includes the steps of controlling designation of a parameter representing the degree of image blurring, controlling the image signal processing apparatus to detect an image characteristic and to output a characteristic code representing the characteristic, controlling reading, from among coefficients stored beforehand, a coefficient corresponding to the parameter designated in the step of controlling the designation and a coefficient corresponding to the characteristic code output in the step of controlling the designation, controlling the image signal processing apparatus to calculate pixel levels for the levels of pixels of the input image based on the coefficients read in the step of controlling the reading, and controlling the image signal processing apparatus to selectively output the pixel levels calculated in the step of controlling the calculation and the levels of pixels of the input image.

According to an image signal processing apparatus and method of the present invention, and a program and recording medium of the present invention which are used with the image signal processing apparatus and method, a parameter representing the degree of image blurring and an image characteristic is detected. A characteristic code representing the detected characteristic is output, and coefficients corresponding to the designated parameter and the output characteristic code are stored. The coefficients are read and, based on the read coefficients, pixel levels are calculated for the levels of pixels of an input image.

According to the present invention, image blurring can be corrected. In particular, in accordance with an image characteristic, appropriate correction of image blurring can be performed.

BRIEF DESCRIPTION OF THE DRAWINGS

FIG. 4 is a table showing examples of control signals;

FIG. 14 is a table showing examples of values of code p2;

FIG. 27 is a table showing examples of output modes; and

DESCRIPTION OF THE PREFERRED EMBODIMENTS

Embodiments of the present invention are described below with reference to the accompanying drawings.

Figure 1:
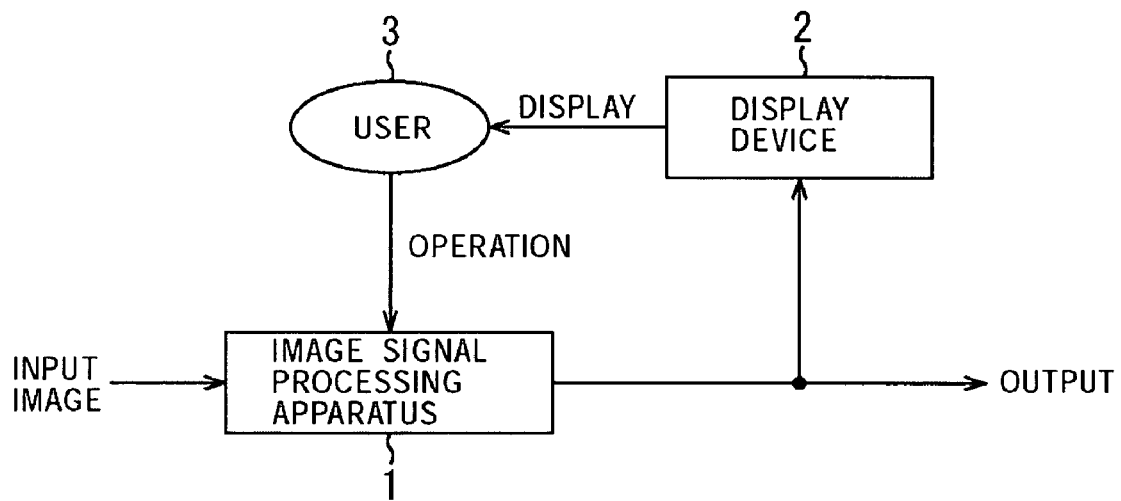
FIG. 1 is a block diagram showing an example of an image signal processing system to which the present invention is applied.

FIG. 1 shows the entire configuration of an image processing system to which the present invention is applied. In this example, an image captured by a digital still camera or the like is input as an input image to an image signal processing apparatus 1. The image signal processing apparatus 1 corrects the input image, and outputs the corrected image to a display device 2, etc. A user 3 operates the image signal processing apparatus 1 while viewing the output image on the display device 2.

Figure 2:
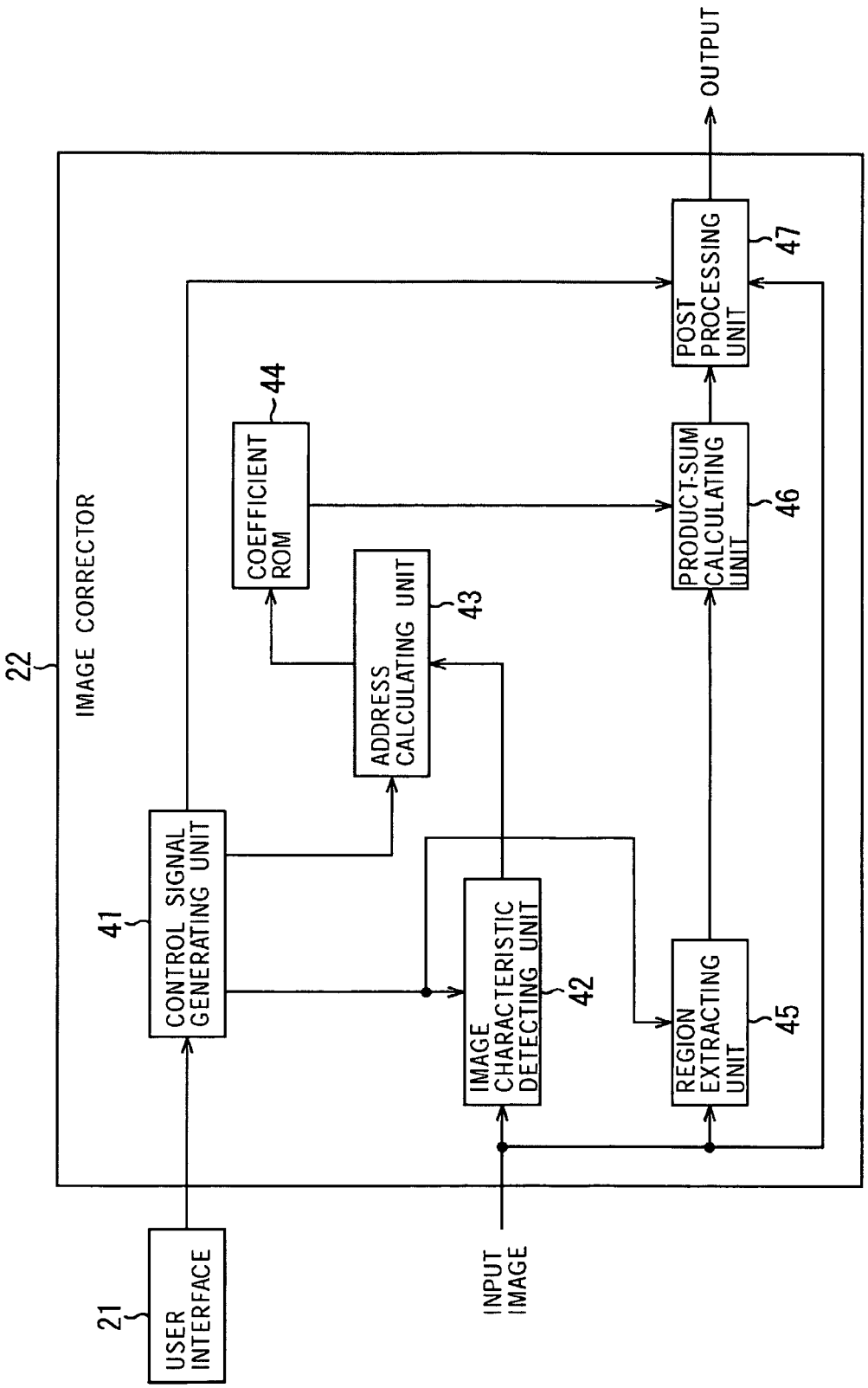
FIG. 2 is a block diagram showing an example of the image signal processing apparatus shown in FIG. 1.

FIG. 2 is a block diagram showing an example of the image signal processing apparatus 1. This example of the image signal processing apparatus 1 is constituted by a user interface 21 for receiving a user's instruction, and an image corrector 22 which, based on an output from the user interface 21, corrects the input image.

The image corrector 22 includes a control signal generating unit 41 for generating control signals based on an output from the user interface 21 and supplying the control signals to other units, an image characteristic detecting unit 42 for detecting characteristics of the input image, an address calculating unit 43 for performing address calculation based on one control signal, a coefficient read-only memory (ROM) 44 which, based on an address calculated by the address calculating unit 43, a predetermined coefficient stored beforehand, and a region extracting unit 45 for extracting a plurality of pixels corresponding to a predetermined region in the input image.

The image corrector 22 also includes a product-sum calculating unit 46 which performs, for the levels of the pixels output from the region extracting unit 45, product-sum calculation based on the coefficient output from the coefficient ROM 44, and a post-processing unit 47 which corrects the input image based on the calculation result output from the product-sum calculating unit 46 and the control signal, and which outputs the corrected image.

Figure 3:
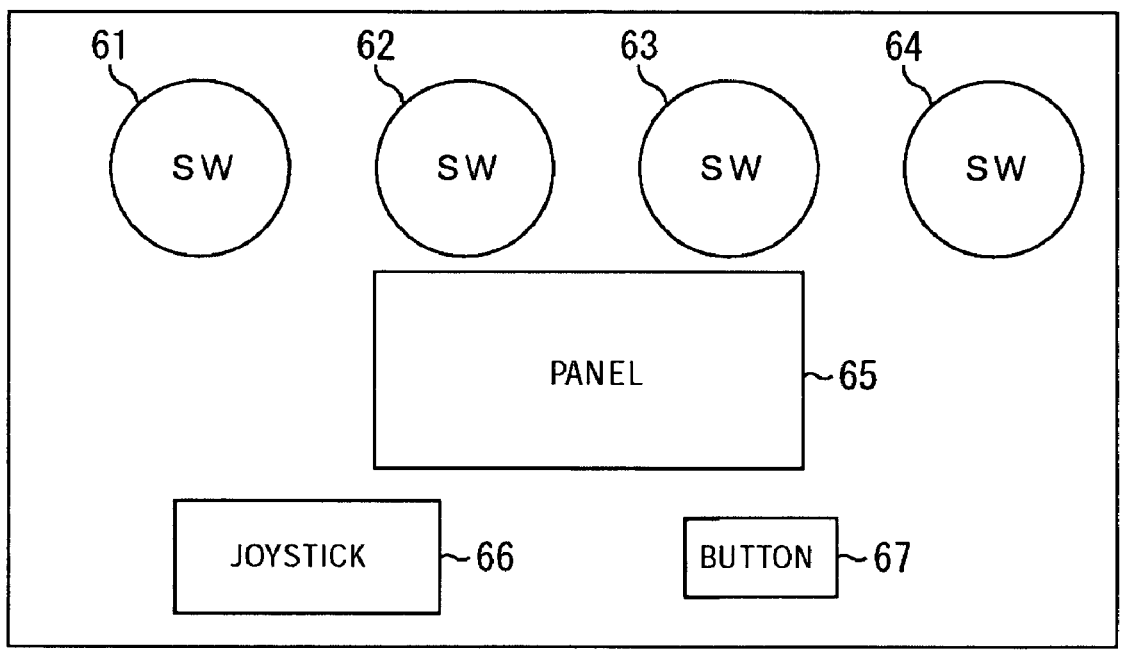
FIG. 3 is a block diagram showing an example of the user interface shown in FIG. 2.

FIG. 3 is a block diagram showing an example of the user interface 21. This example of the user interface 21 is provided with switches 61 to 64 for designating pieces of information, such as various parameters and threshold values, a joystick 66 for designating a region to be corrected in the input image, and a button 67 for designating switching of output image states. Pieces of information designated by the switches 61 to 64 are displayed on a panel 65. Based on the designated pieces of information, the control signal generating unit 41 generates and supplies a plurality of control signals to the other units in the image corrector 22.

FIG. 4 shows the examples of the control signals generated by the control signal generating unit 41. Control signal A is used to specify a portion (blurred portion) to be corrected in the input image. Control signal A is generated based on designation using the joystick 66 and is supplied to the region extracting unit 45 and the post-processing unit 47. Control signal B is used to specify parameter σ representing the degree of blurring. Control signal B is generated based on designation using the switch 61 and is supplied to the address calculating unit 43. Control signal C is used to designate switching of values of weight $W_a$ in expression for use in solving model expressions representing blurring. Control signal C is generated based on designation using the switch 62 and is supplied to the address calculating unit 43. Weight Wa in expression is described later.

Control signal D is used to designate switching of threshold values for use in detecting image characteristics. Control signal D is generated based on designation using the switch 63 and is supplied to the image characteristic detecting unit 42. Control signal E is used to designate switching of threshold values for use in determining whether the levels of pixels of an output image are to be corrected. Control signal E is generated based on designation using the switch 64 and is supplied to the post-processing unit 47. Control signal F is used to designate switching of display modes of an output image. Control signal F is generated based on designation using the button 67 and is supplied to the post-processing unit 47. The switching of threshold values and the switching of display modes are described later.

Figure 5B:
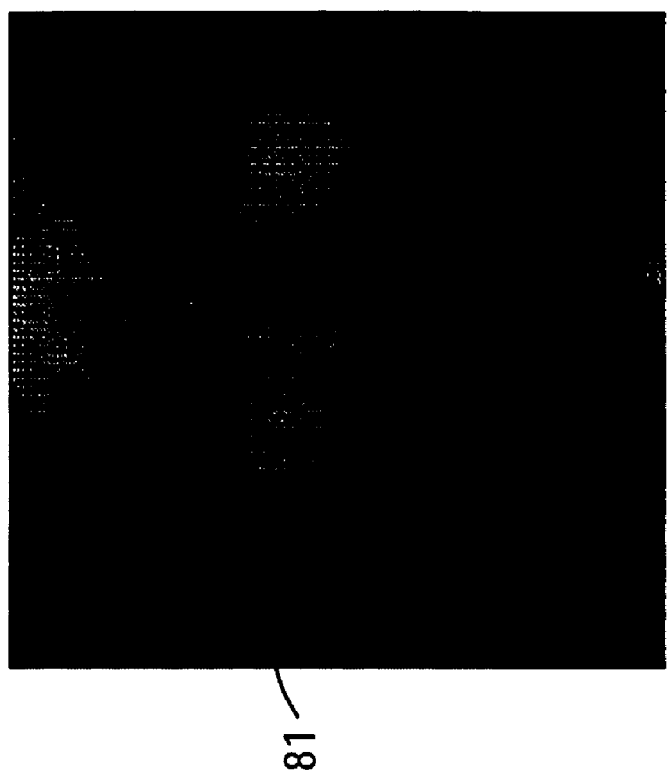
FIGS. 5A and 5B are photographs showing states in which blurred-subject images are displayed on the display device shown in FIG. 1.
Figure 5A:

Next, the principle of image blurring is described below. FIGS. 5A and 5B are photographs showing images captured by a digital still camera having an image capturing device such as a charge-coupled device (CCD). FIG. 5A shows a photograph with an image of an actual subject accurately displayed thereon. FIG. 5B shows a photograph with an image of the subject blurred due to focusing on a background by an automatic focusing function or the like of the digital still camera. When the level of a pixel of the photograph in FIG. 5A is represented by X and regarded as a true value, the level of a pixel of the photograph in FIG. 5B is represented by Y and regarded as an observed value, and, in order to represent a plurality of pixels constituting each photograph, a horizontal coordinate in the photograph is represented by x, and a vertical coordinate in the photograph is represented by y, a true value can be represented by X(x, y), and an observed value can be expressed by Y(x, y).

In the present invention, the following expression (1) is used as a model expression representing blurring. In the following expression (1), by using the Gaussian function shown in the following expression (2), and convoluting the Gaussian function in true value X(x, y), observed value Y(x, y) is obtained.

$$Y(x, y) = \sum_{\substack{-r \leq i \leq r \\ -r \leq j \leq r}} [W(i, j) \times X(x+i, y+j)] \quad (1)$$

$$W(j, i) = \frac{1}{2\pi\sigma^2} e^{-\frac{j^2+i^2}{2\sigma^2}} \quad (2)$$

In Expression (1), parameter σ represents the degree of blurring.

According to Expression (1), observed value Y(x, y) is calculated by using coefficient W to weight a plurality of true values X(x+i, y+j) which change based on variables i and j, where −r<i<r, and −r<j<r. Therefore, it is assumed that the levels of the pixels 81 shown in FIG. 5B are obtained based on the levels of pixels in the range 80 shown in FIG. 5A.

In addition, the degree of blurring changes based on parameter σ. This is described below with reference to FIGS. 6 to 9.

Figure 6:
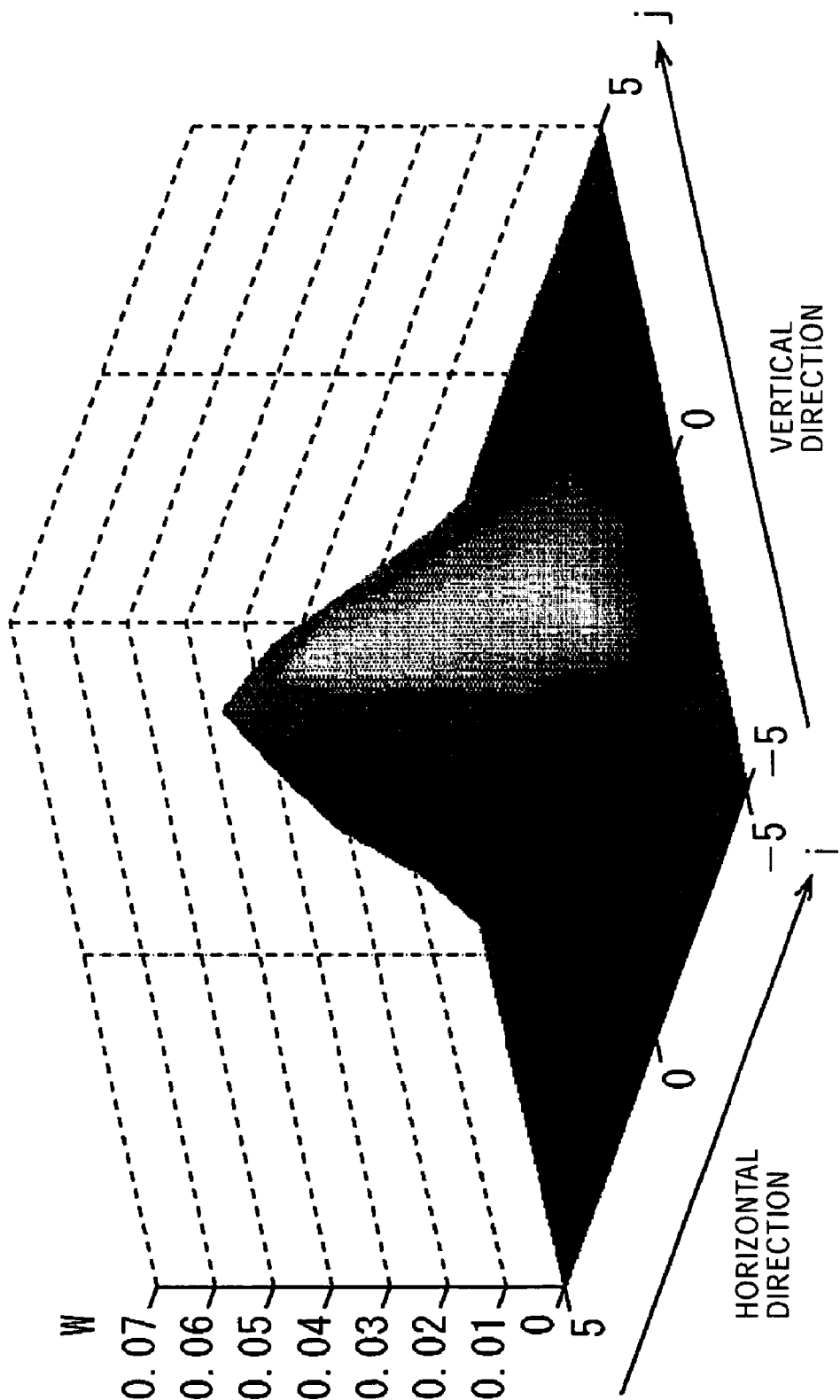
FIG. 6 is a three-dimensional graph showing the distribution of values of coefficient W when parameter σ is small.
Figure 7:
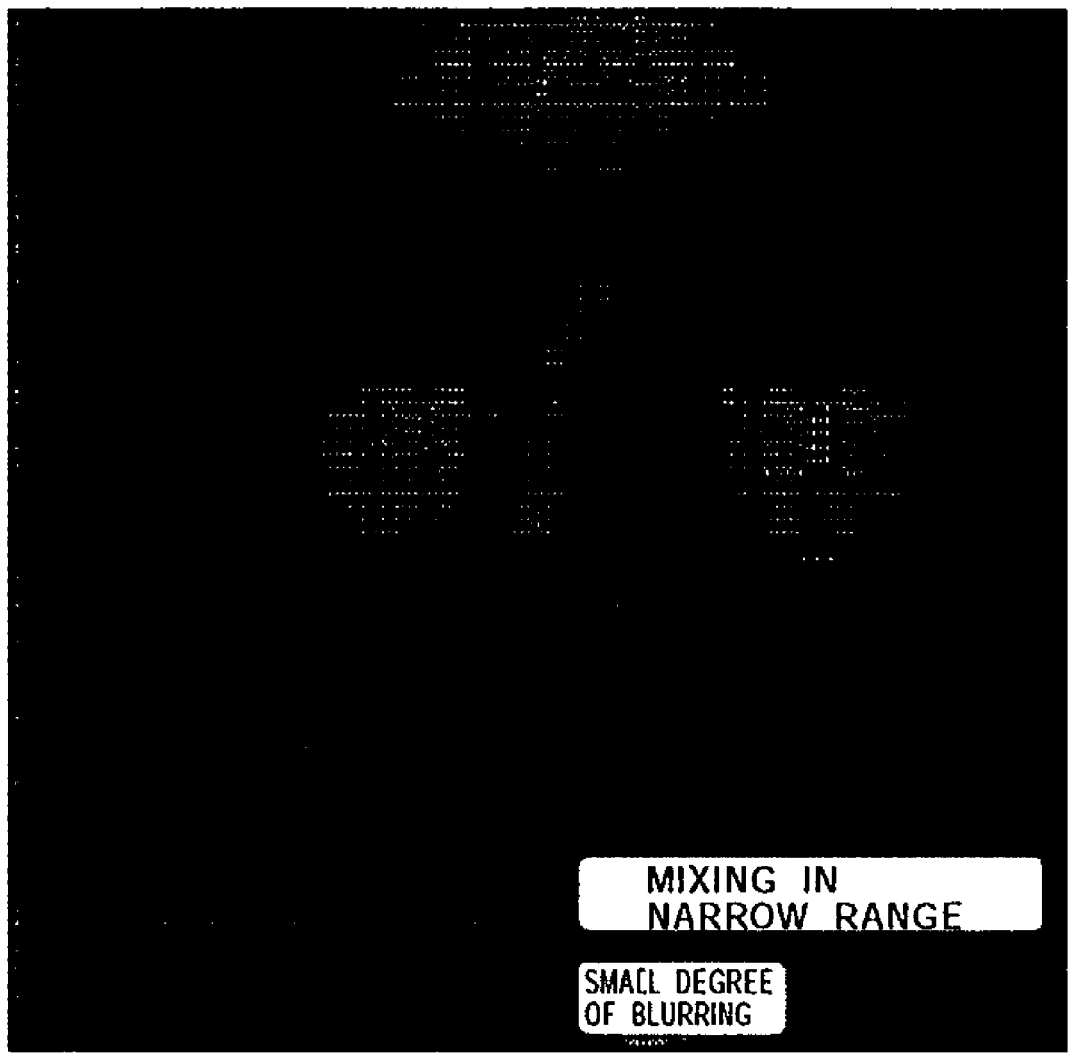
FIG. 7 is a photograph showing a state in which a blurred-subject image as represented by the case in FIG. 6 is displayed.

FIG. 6 is a three-dimensional graph showing the distribution in magnitude of values of coefficient W in Expression (1) when the value of parameter σ is relatively small. The graph shown in FIG. 6 has an axis i indicating the horizontal direction, an axis j indicating the vertical direction, and an axis W indicating the magnitudes of values of coefficient W. The values of coefficient W protrude around the center of the graph, and are uniformly low in portions at a distance from the center. These characteristics indicate that pieces of true value information are not diffused in a broad range in terms of observed values, and represent a relatively-small-blurring image as shown in the photograph of FIG. 7.

Figure 8:
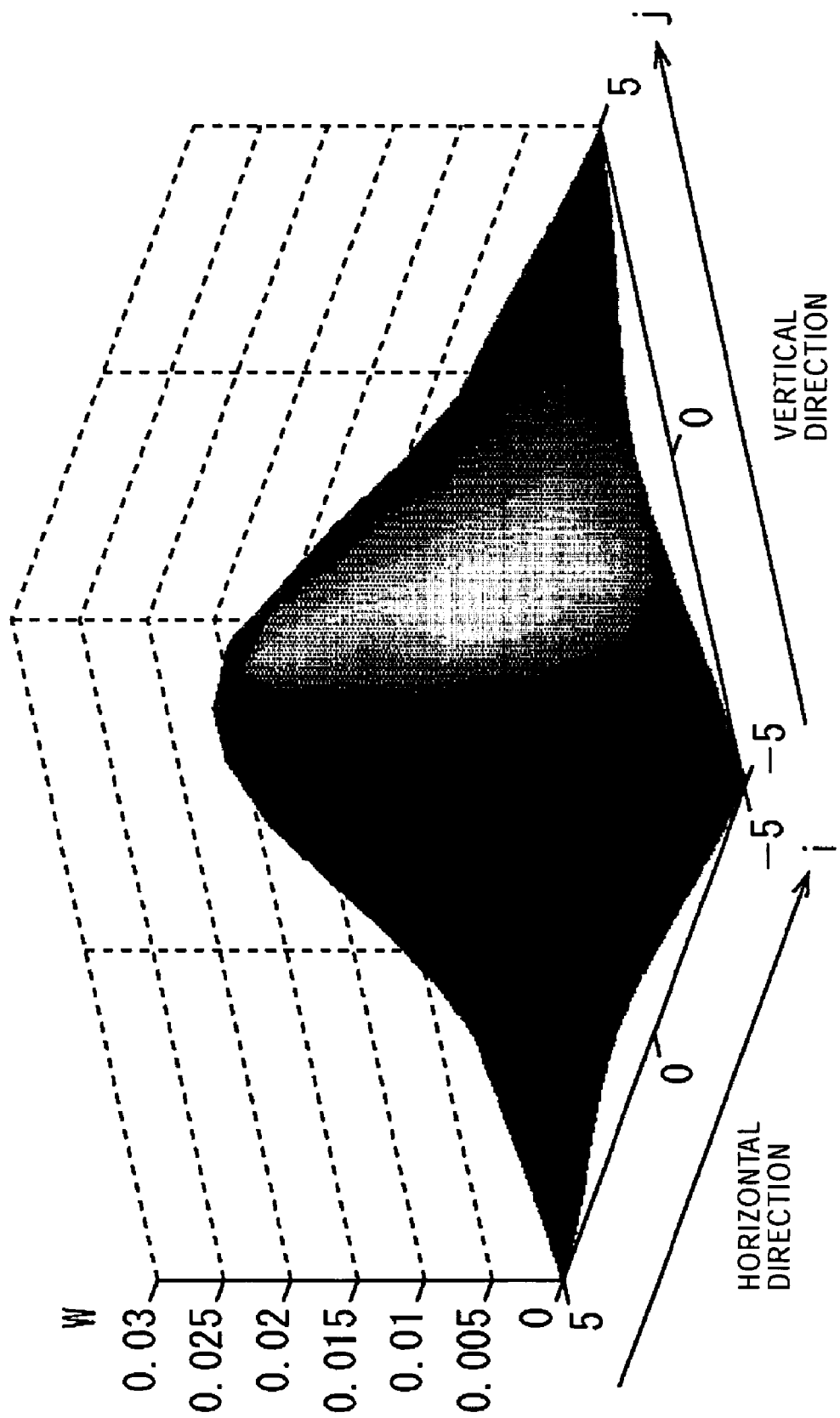
FIG. 8 is a three-dimensional graph showing the distribution of values of coefficient W when parameter σ is large.
Figure 9:
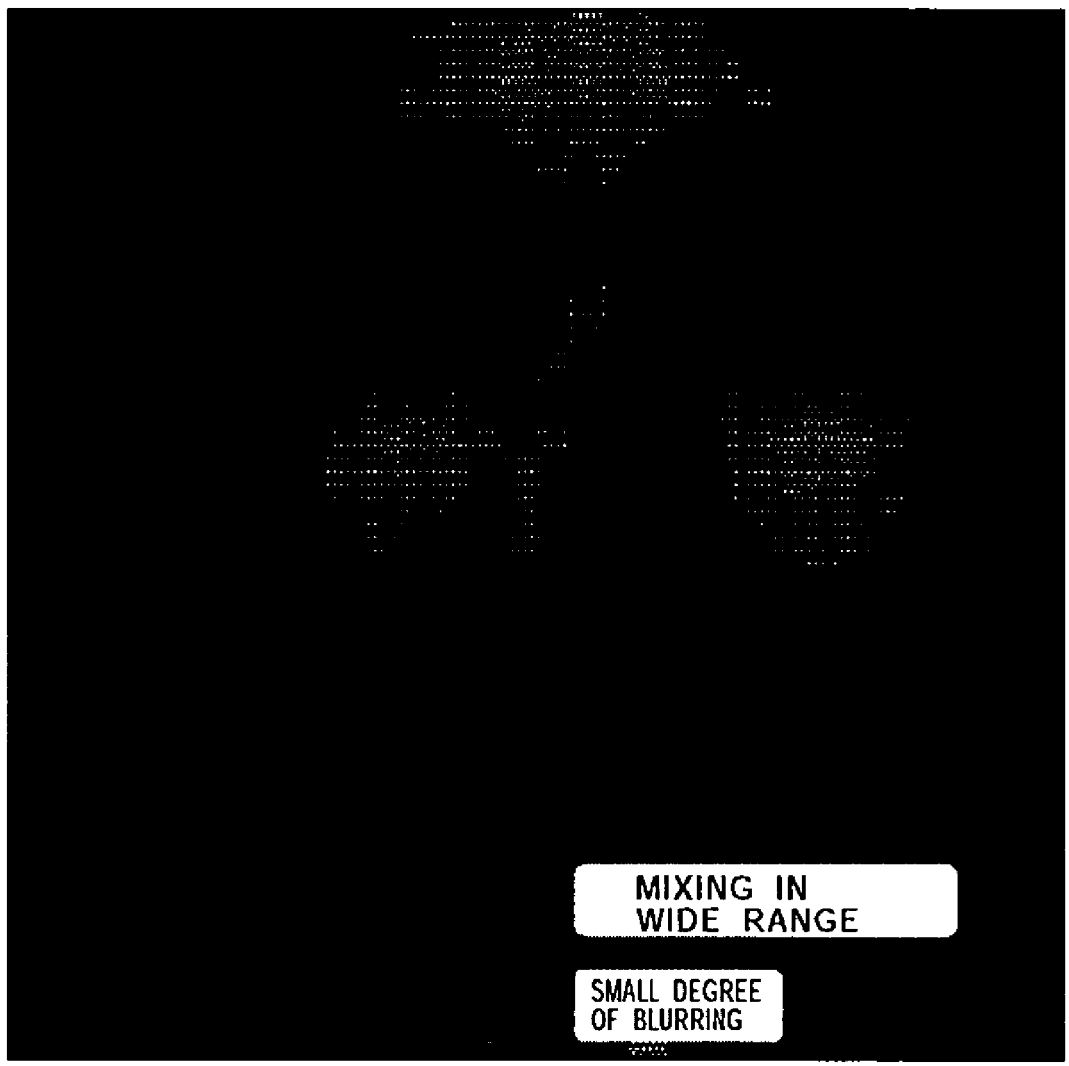
FIG. 9 is a photograph showing a state in which a blurred-subject image as represented by the case in FIG. 8 is displayed on the display device shown in FIG. 1.
Figure 10:
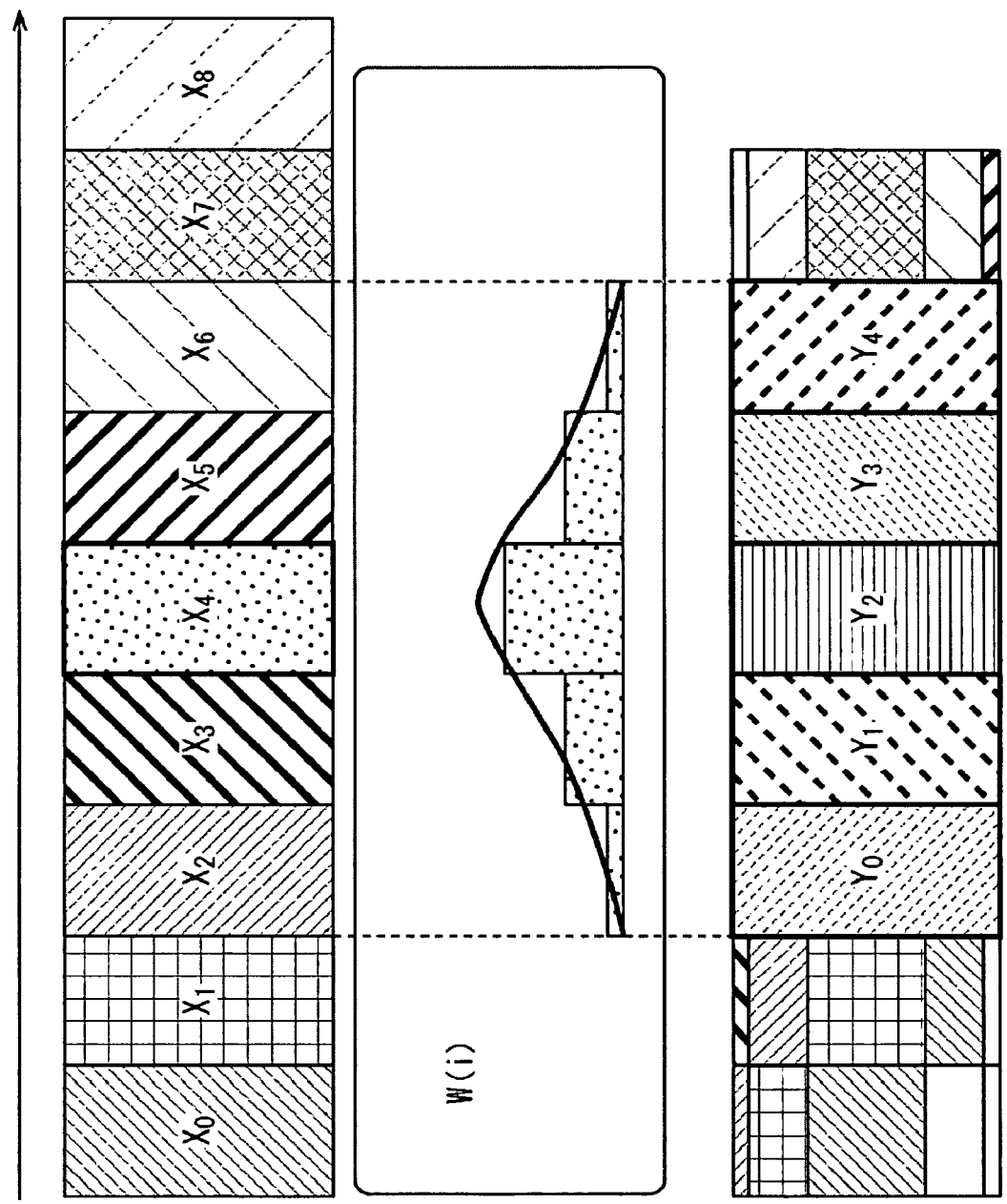
FIGS. 10A, 10B, and 10C are one-dimensional graphs showing relationship between observed values and true values.

Conversely, FIG. 8 is a three-dimensional graph showing the distribution in magnitude of values of coefficient W in Expression (1) when the value of parameter σ is relatively large. The graph in FIG. 8 is three-dimensional similarly to FIG. 6. Compared with the case of the FIG. 6, the graph in FIG. 8 has no remarkable protrusion of values of coefficient W around the center, and the values of coefficient W are indicated in a gently inclined form. These characteristics indicate that pieces of true value information are diffused in a broad range in terms of observed values, and represent a relatively-large-blurring image as shown in the photograph of FIG. 9.

As described above, the degree of blurring changes with a change in value of parameter σ. Thus, for accurate correction of image blurring, the value of parameter σ must be appropriately found. However, it is difficult to automatically and appropriately set the value of parameter σ based on the degrees of input image blurring. Accordingly, in the present invention, the value of parameter σ is designated such that the switch 61 is operated by the user (the Control signal B shown in FIG. 4).

The principle of image blurring is further described below with reference to FIGS. 10 to 13.

FIG. 10A is an illustration of true values X0 to X8 concerning an image on the assumption that pixels are one-dimensionally arranged in the horizontal direction for brevity of description. FIG. 10C is an illustration of observed values corresponding to the true values X0 to X8 shown in FIG. 10A. FIG. 10B is a bar graph showing the magnitude of coefficient W(i). In this example, variable i represents −2≤i≤2, the center bar represents coefficient W(0), and the leftmost bar to the rightmost bar sequentially represent coefficients W(−2), W(−1), W(0), W(1), W(2).

Here, based on Expression (1), the observed value $Y_2$ shown in FIG. 10C is calculated as follows:

$$Y_2 = W(-2)X_2 + W(-1)X_3 + W(0)X_4 + W(1)X_5 + W(2)X_6$$

Figure 11:
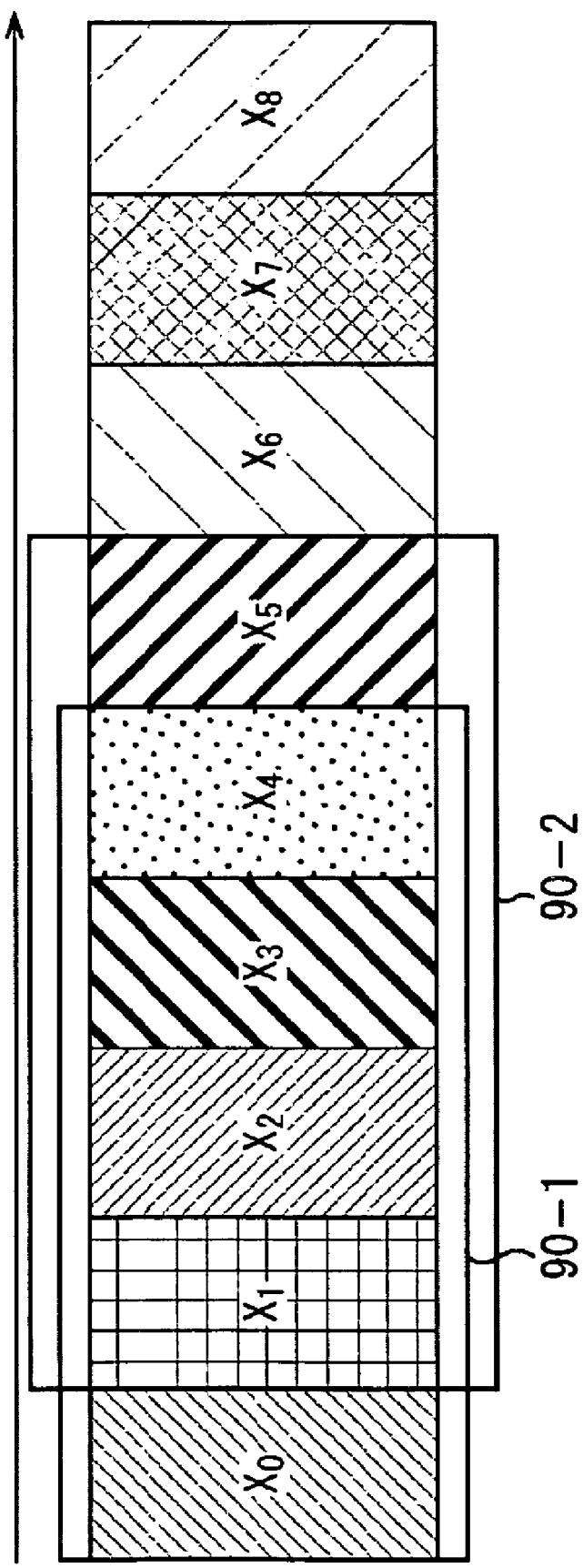
FIG. 11 is a one-dimensional graph showing the relationship between observed values and true values.

Similarly, in the case of calculating the observed value $Y_0$ shown in FIG. 10C, by performing calculation based on part of the true values $X_0$ to $X_8$ which is surrounded by the frame 90-1 shown in FIG. 11, observed value $Y_0$ is calculated as follows:

$$Y_0 = W(-2)X_0 + W(-1)X_1 + W(0)X_2 + W(1)X_3 + W(2)X_4$$

In the case of calculating observed value Y1, by performing calculation based on part of the true values $X_0$ to $X_8$ which is surrounded by the frame 90-2 shown in FIG. 11, observed value Y1 is calculated as follows:

$$Y_1 = W(-2)X_1 + W(-1)X_2 + W(0)X_3 + W(1)X_4 + W(2)X_5$$

Observed values $Y_3$ and $Y_4$ can be similarly calculated.

Figure 12:
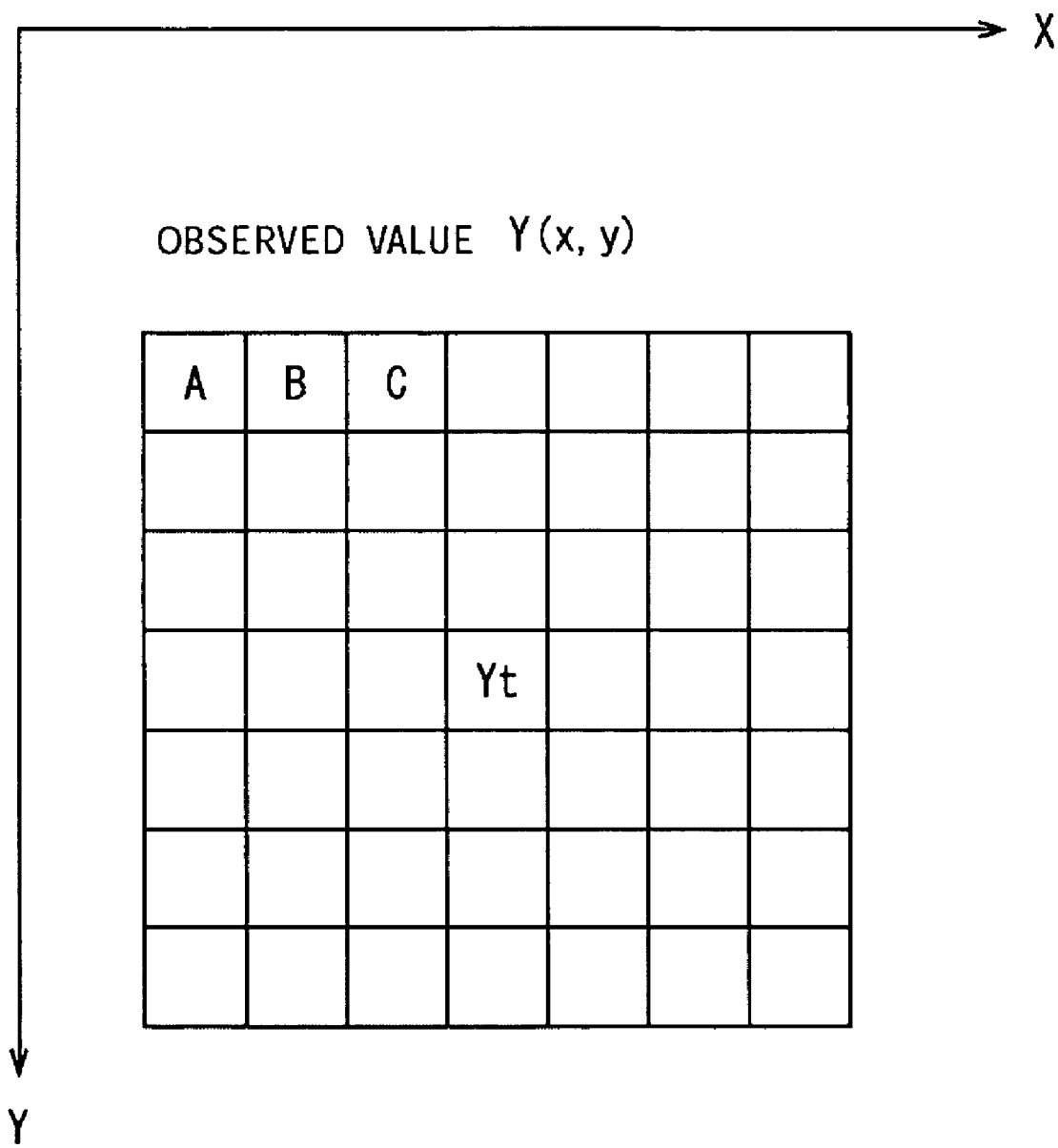
FIG. 12 is a two-dimensional diagram showing the relationship between observed values and true values.
Figure 13:
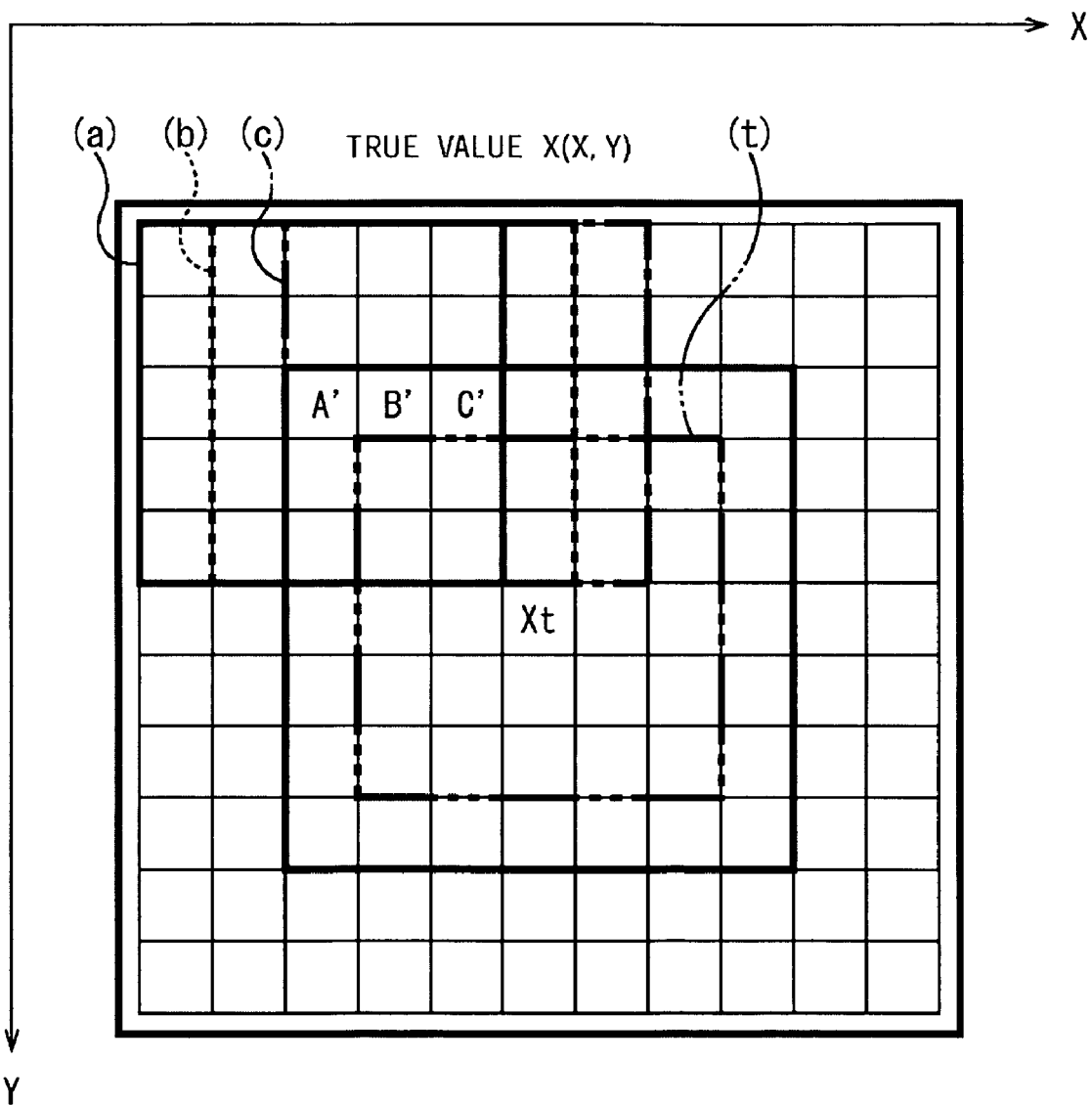
FIG. 13 is a two-dimensional diagram showing the relationship between observed values and true values.

FIGS. 12 and 13 are two-dimensional representations of the relationship between the true values in FIG. 10A and the observed values in FIG. 10C. In other words, the levels of pixels shown in FIG. 12 are obtained by using the levels of pixels shown in FIG. 13 as true values. In this case, observed value Y(x, y) corresponding to the pixel A in FIG. 12 is calculated as follows:

$$Y(x,y) = W(-2,-2)X(x-2, y-2) + W(-1,-2)X(x-1, y-2) + W(0, 0.2)X(x, y-2) \ldots + W(2,2)X(x+2, y+2)$$

In other words, an observed value corresponding to the pixel A shown in FIG. 12 is found based on true values corresponding to 25 (=5×5) pixels around pixel A' (corresponding to pixel A) in the frame a shown in FIG. 13. Similarly, an observed value corresponding to the pixel B (adjacent pixel on the right of pixel A in FIG. 12) shown in FIG. 12 is found based on true values corresponding to 25 pixels around pixel B' (corresponding to pixel B). In addition, an observed value corresponding to the pixel C shown in FIG. 12 is found based on true values corresponding to 25 pixels around the pixel C' (corresponding to pixel C) shown in FIG. 13. Expressions for calculating observed values Y(x+1, y) and Y(x+2, y) corresponding to the pixels B and C shown in FIG. 12 are shown below.

$$Y(x+1,y) = W(-2,-2)X(x-1, y-2) + W(-1,-2)X(x, y-2) + W(0,-2)X(x-1, y-2) \ldots + W(2,2)X(x+3, y+2)$$

$$Y(x+2,y) = W(-2,-2)X(x, y-2) + W(-1,-2)X(x+1, y-2) + W(0,-2)X(x+2, y-2) \ldots + W(2,2)X(x+4, y+2)$$

By calculating observed values according to the pixels shown in FIG. 12 in the above manner, the determinants indicated by the following Expressions (3) to (6) are obtained.

$$Y_f = \begin{pmatrix} Y(x, y) \\ Y(x+1, y) \\ Y(x+2, y) \\ Y(x+3, y) \\ \vdots \\ Y(x, y+1) \\ Y(x+1, y+1) \\ \vdots \\ Y(x+7, y+7) \end{pmatrix} \quad (3)$$

$$W_f = \begin{pmatrix} W(-2,-2) & W(-1,-2) & \cdots & W(2,2) \\ W(-2,-2) & W(-1,-2) & \cdots & W(2,2) \\ \vdots & \vdots & \vdots & \vdots \\ W(-2,-2) & W(-1, y-2) & \cdots & W(2,2) \end{pmatrix} \quad (4)$$

$$X_f = \begin{pmatrix} X(x-2, y-2) & X(x-1, y-2) & \cdots & X(x, y-2) \\ X(x-1, y-2) & X(x, y-2) & \cdots & X(x+1, y-2) \\ \vdots & \vdots & \vdots & \vdots \\ X(x+2, y+2) & X(x+3, y+2) & \cdots & X(x+9, y+9) \end{pmatrix} \quad (5)$$

$$Y_f = W_f X_f \quad (6)$$

Here, by finding the inverse matrix of matrix $W_f$ in Expression (determinant) (6), true value $X_f$ can be calculated based on observed value $Y_f$. In other words, based on pixels of a blurred image, pixels of an image having no blurring can be obtained, so that the blurred image can be corrected.

However, as described above with reference to FIGS. 10 to 13, in Expressions (determinants) (3) to (6), the number of pixels corresponding to true values is greater than that of pixels corresponding to observed values. Thus, inverse matrices cannot be calculated. For example, in the example shown in FIG. 11, five pixels corresponding to true values are required for one pixel corresponding to an observed value.

Accordingly, in addition to Expressions (3) to (6), the following Expressions (7) to (10) are employed.

$$W_a(p_1)W_1(p_2)(X(x, y) - X(x, y-1)) = 0 \quad (7)$$

$$W_a(p_1)W_2(p_2)(X(x, y) - X(x+1, y)) = 0 \quad (8)$$

$$W_a(p_1)W_3(p_2)(X(x, y) - X(x, y+1)) = 0 \quad (9)$$

$$W_a(p_1)W_4(p_2)(X(x, y) - X(x-1, y)) = 0 \quad (10)$$

Expressions (7) to (10) are used to limit a difference in level of adjacent pixels. When a true value to be calculated represents a flat (i.e., no large difference from the level of an adjacent pixel) portion of the image, inconsistency does not occur. However, when a true value to be calculated represents an edge portion (i.e., in the case of having a large difference from an adjacent pixel), there is a possibility that inconsistency may occur to cause deterioration in corrected image. Accordingly, for appropriate correction of a blurred image, four Expressions (7) to (10) must be selectively used for each pixel so that the edge portion corresponding to the true value is excluded.

Therefore, the image characteristic detecting unit 42 detects edge portions and flat portions in the input image, and generates code p2 representing the directions (e.g., vertical and horizontal directions) of the flat portions. A detailed operation of the image characteristic detecting unit 42 is described below with reference to FIG. 20. In the present invention, it is assumed that the results of detecting the edge portions and flat portions in the input image (observed values) be equal to those of detecting edge portions and flat portions concerning true values.

In Expressions (7) to (10), functions $W_1$ to $W_4$ that are functions of code p2 are weighting functions. In the present invention, weighting functions $W_1$ to $W_4$ are controlled in response to code p2, whereby Expressions (7) to (10) are selectively used for each pixel. FIG. 14 shows the values of weighting functions $W_1$ to $W_4$ corresponding to code p2. When the values of the weighting functions $W_1$ to $W_4$ are large, it is strongly indicated that Expressions (7) to (10) represent flatness. When the values of the weighting functions $W_1$ to $W_4$ are smaller, the indication is weak, that is, it is strongly indicated that Expressions (7) to (10) represents an edge state of pixel levels.

Code p2 consists of four bits. The four bits indicate, sequentially from the leftmost, whether or not pixels have flat levels in the upward, right, downward, and left directions, respectively. When pixel levels are flat in each direction, the corresponding bit is set to "1". For example, when code p2 is "0001", the value indicates that pixels in the left direction from a pixel of interest have flat levels and that other pixels in the other directions have no flat levels (i.e., there is an edge in pixel level). Accordingly, when code p2 is "0001", the value of weighting function $W_4$ is large, and, among four Expressions (7) to (10), Expression (10) has a larger weight. This enables the weights of the four expressions to be changed by using code p2. Accordingly, the four expressions can be selectively used for each pixel so that an edge in pixel level is excluded.

Figure 15:
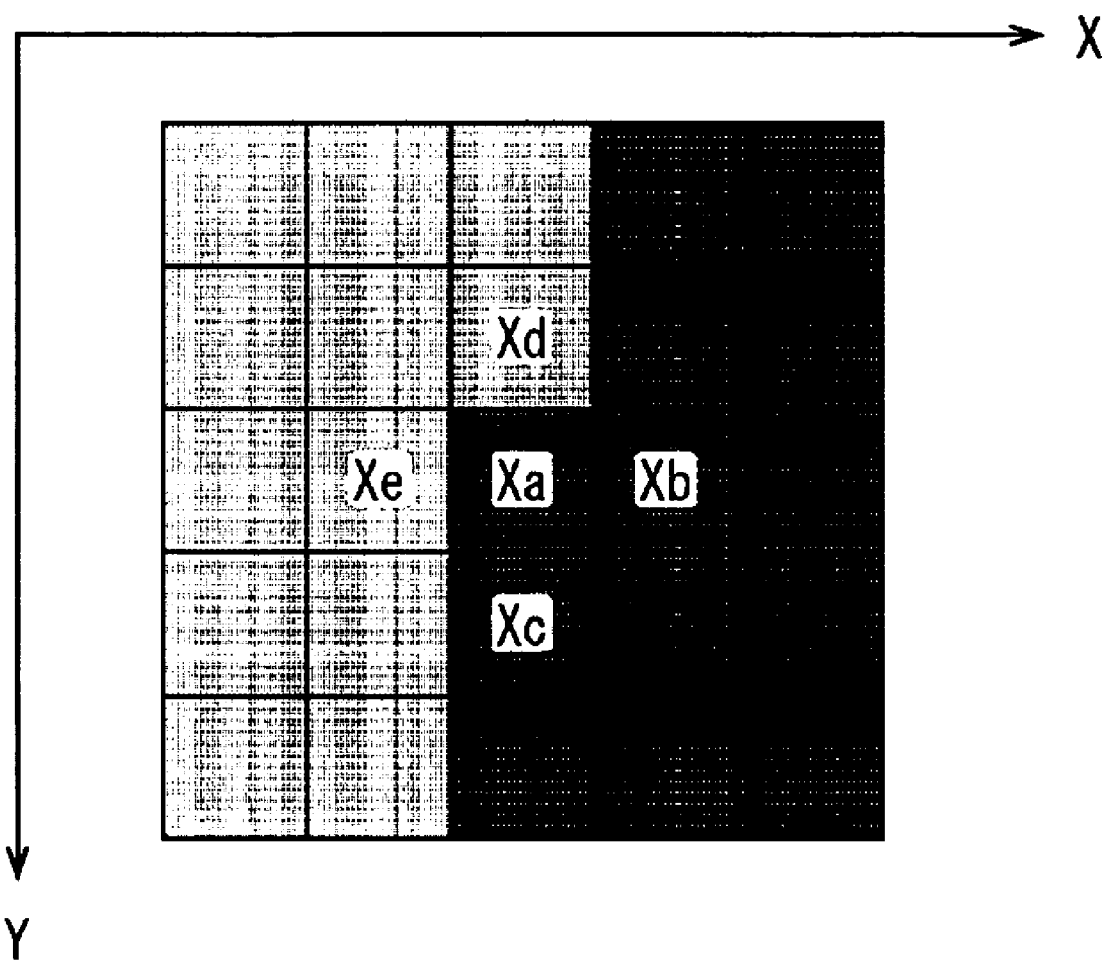
FIG. 15 is a diagram showing directions in which pixels with respect to a pixel of interest have flat levels and directions in which pixels with respect to the pixel of interest have levels indicating edges.

By way of example, as FIG. 15 shows, when pixel in the upward and left directions from a pixel of interest Xa have flat levels, and pixels in the right and downward directions from the pixel of interest Xa have edge levels, by using code p2 to change the weights of four Expressions (7) to (10), differences in levels of adjacent pixels are such limited that "Xa−Xb=0" and "Xa−Xc=0". However, such limitation that "Xa−Xd=0" and "Xa−Xe=0". Xb, Xc, Xd, and Xe respectively represent right, lower, upper, left pixels adjacent to the pixel of interest Xa.

In Expressions (7) to (10), weighting function Wa is another weighting function, so that the value of weighting function $W_a$ is changed by using code p1. By changing the value of weighting function $W_a$, the noise and details of the entirety of the corrected image can be controlled. When the value of weighting function $W_a$ is large, the corrected image looks in a form less affected by noise, with no sense of noise. In addition, when the value of weighting function $W_a$, the corrected image looks in a form with details enhanced, with a sense of details.

Code P1 which changes the value of weighting function $W_a$ corresponds to Control signal C in FIG. 4, and is adjusted by the user in accordance with the state of the input image. For example, for an input image whose quality is considerably deteriorated by compression such as JPEG, by increasing weights, a natural output image with noise suppressed can be obtained, though a sense of details is lost.

In the above manner, in addition to Expressions (3) to (6), Expressions (7) to (10) are employed. This enables calculation of an inverse matrix as shown in the following Expression (11). As a result, a true value can be calculated based on observed values.

$$X_S = W_S^{-1} Y_S \qquad (11)$$

In the present invention, the coefficient ROM 44 (in FIG. 2) stores beforehand coefficient $W_S^{-1}$ concerning observed value $Y_S$, and for the input image, which is extracted by the region extracting unit 45, calculation (product-sum calculation) by the determinant in Expression (11) is performed by the product-sum calculating unit 46. This eliminates the need to perform inverse matrix calculation whenever image correction is performed, and enables correction of blurring by using only the product-sum calculation. In this case, the value of parameter σ and the four expressions differ depending on the input image. Thus, inverse matrix calculation based on all possible combinations of the parameter σ and the four expressions is performed beforehand, and addresses corresponding to parameter σ, code p2, etc., are set. At the addresses, different coefficients are stored in the coefficient ROM 44.

However, for example, when the combination of weighting functions $W_1$ to $W_4$ is changed and the four expressions are switched for all the 25 (=5×5) pixels in the frame (t) shown in FIG. 13, there are combinations whose number is represented by 15 (=the number of combinations of weighting functions $W_1$ to $W_4$ shown in FIG. 14) to the power of 25 (=the number of pixels in the frame (t)). If inverse matrix calculation is performed for each combination, a great number of coefficients is generated. Accordingly, all the coefficients may not be stored since the storage size of the coefficient ROM 44 is limited. In this case, for the center pixel Xt in the frame (t), based on its characteristic, code p2 may be changed to switch the expressions, and in the expressions for pixels other than the pixel Xt in the frame (t), for example, code p2 may be pseudo-fixed to "1111". This can limits the number of coefficient combinations to fifteen.

In the foregoing, in order to describe the principle of blurring (model expression), the domain of the Gaussian function is −2≦(x, y)≦2. However, actually, a range which can sufficiently cope with a case in which the value of parameter σ is set. In addition, expressions describing image characteristics are not limited to Expressions (7) to (10). Moreover, regarding the case of the limited storage size of the coefficient ROM 44, an example of switching the expressions with limitation to the central phase (Xt) has been described. However, a method of switching the expressions is not limited to the above example, but may be changed in accordance with the storage size of the coefficient ROM 44.

Next, a blurring correcting process of the image signal processing apparatus 1 is described below with reference to FIG. 16. This process is executed when an image is input to the image signal processing apparatus 1.

Figure 17:
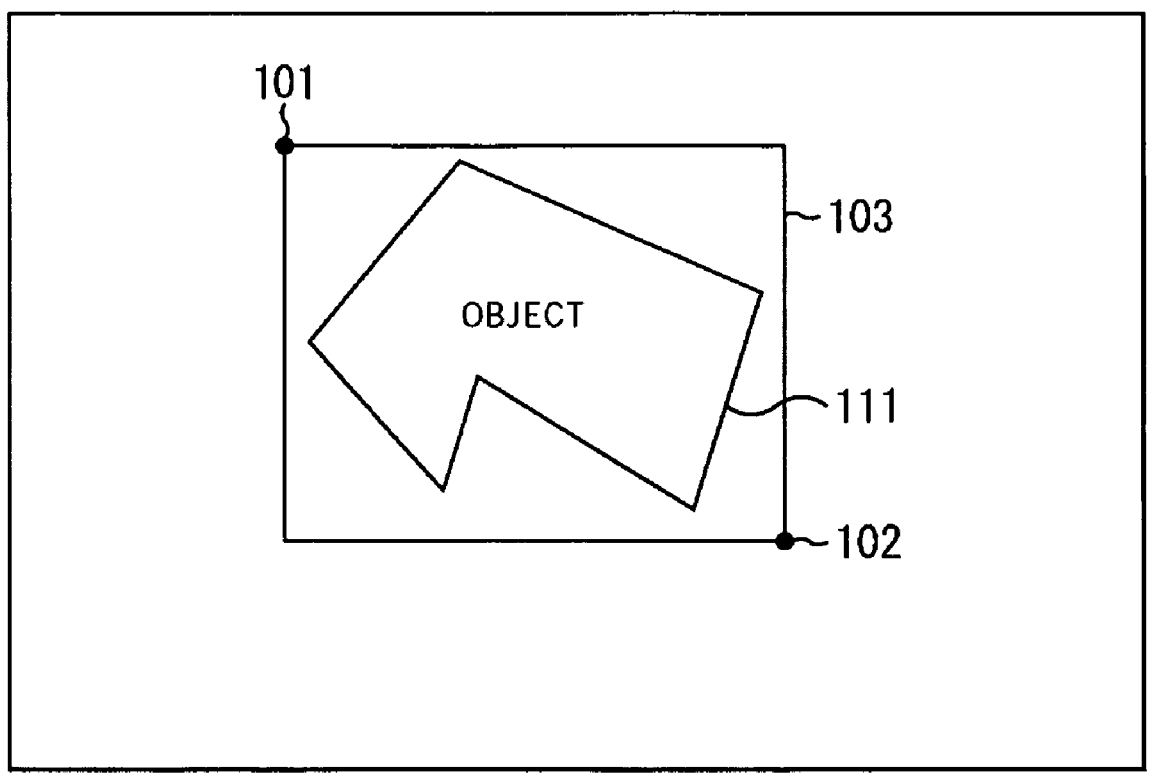
FIG. 17 is a schematic illustration of an input image.

In step S1, designation of a region to be processed is received from the user 3. The region to be processed is an area of the input image in which blurring is to be corrected. Designation of the region to be processed is performed in, for example, the following manner. When the input image shown in FIG. 17 is displayed on the display device 2, and blurring in an object (main subject) 111 in the displayed image needs to be corrected, the user 3 operates the joystick 66 to designate points 101 and 102. In this operation, a rectangular region 103 to be processed which including the object 111 is set based on the points 101 and 102. Information of the setting is supplied to the control signal generating unit 41, and Control signal A as described above with reference to FIG. 4 is generated. In other words, Control signal A corresponds to the region 103 to be processed.

In step S2, the user interface 21 receives parameter σ input by the user 3. Parameter σ is designated such that the switch 61 is operated by the user 3, as described above with reference to FIG. 4. Information of the designation is supplied to the control signal generating unit 41, and Control signal B is generated.

In step S3, the user interface 21 receives other parameters input by the user 3. At this time, pieces of information for generating the Control signals C to E shown in FIG. 4 are designated such that the user 3 operates the switches 62 to 64. In addition, all or part of the pieces of information may be fixed without being designated for each time.

In step S4, the coefficient ROM 44 executes an image correcting process, which is described later by referring to FIG. 18. In this process, a blurred image is corrected and output to the display device 2. In step S5, based on an instruction of the user 3, the user interface 21 determines whether the result of the image correcting process is satisfactory. At this time, "Satisfactory Result" or "Unsatisfactory Result" is designated such that the user 3 operates, for example, the joystick 66. If the process has determined in step S5 that the result of the image correcting process is not satisfactory, the process returns to step S2, and the subsequent steps are repeatedly executed. This designates parameter σ (and other parameters) again, and a very appropriately corrected image can be obtained.

In step S5, If the process has determined in step S5 that the result of the image correcting process is satisfactory, the process ends.

As described above, it is difficult to automatically and appropriately set the value of parameter σ based on the degree of blurring in the input image. However, the present invention enables the user 3 to confirm the result of the image correcting process and to adjust the value of parameter σ, as required. Thus, a very appropriately corrected image can be obtained.

Figure 16:
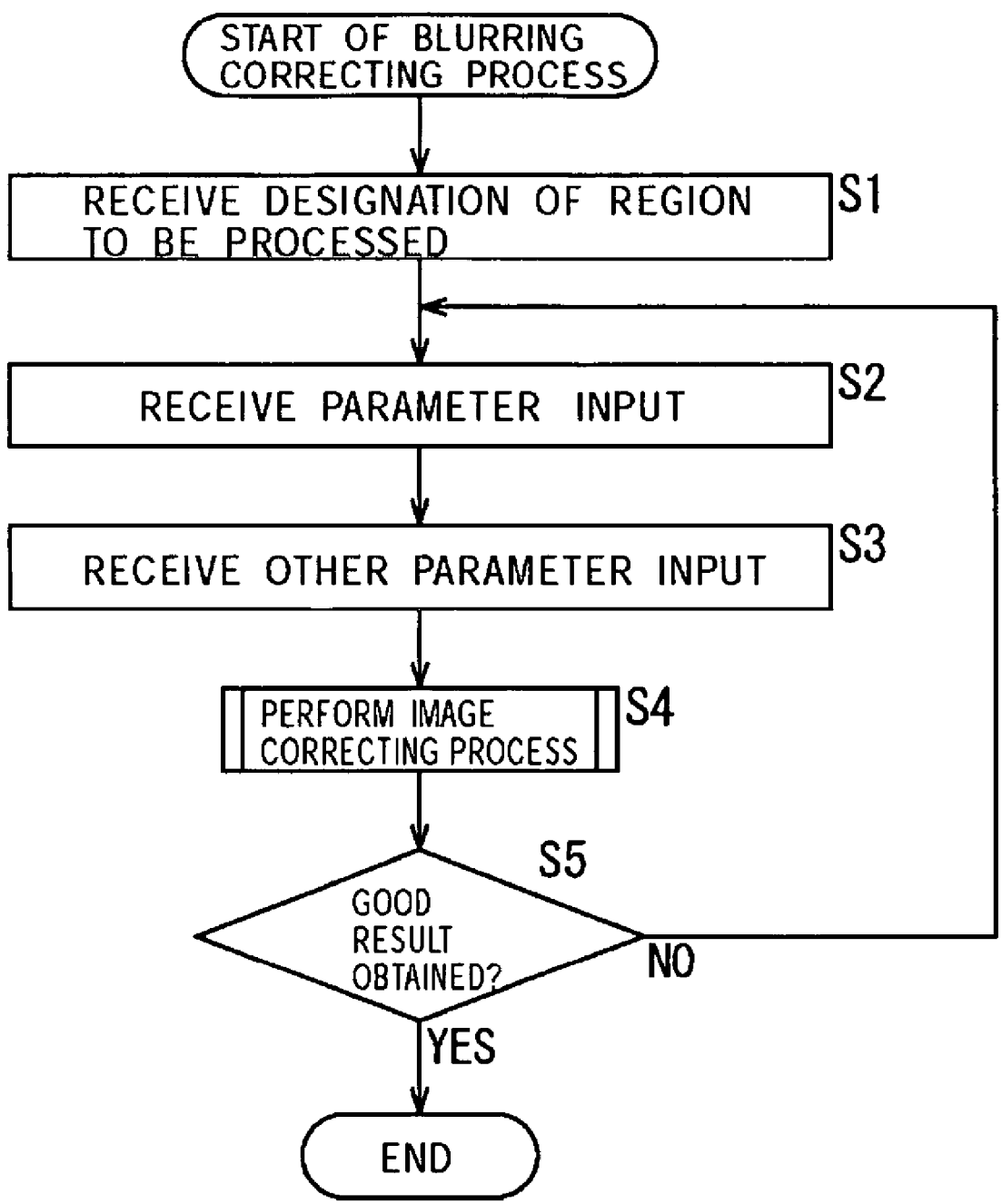
FIG. 16 is a flowchart illustrating a blurring correcting process.

Next, details of the image correcting process shown in FIG. 16 are described below with reference to FIG. 18.

Figure 20:
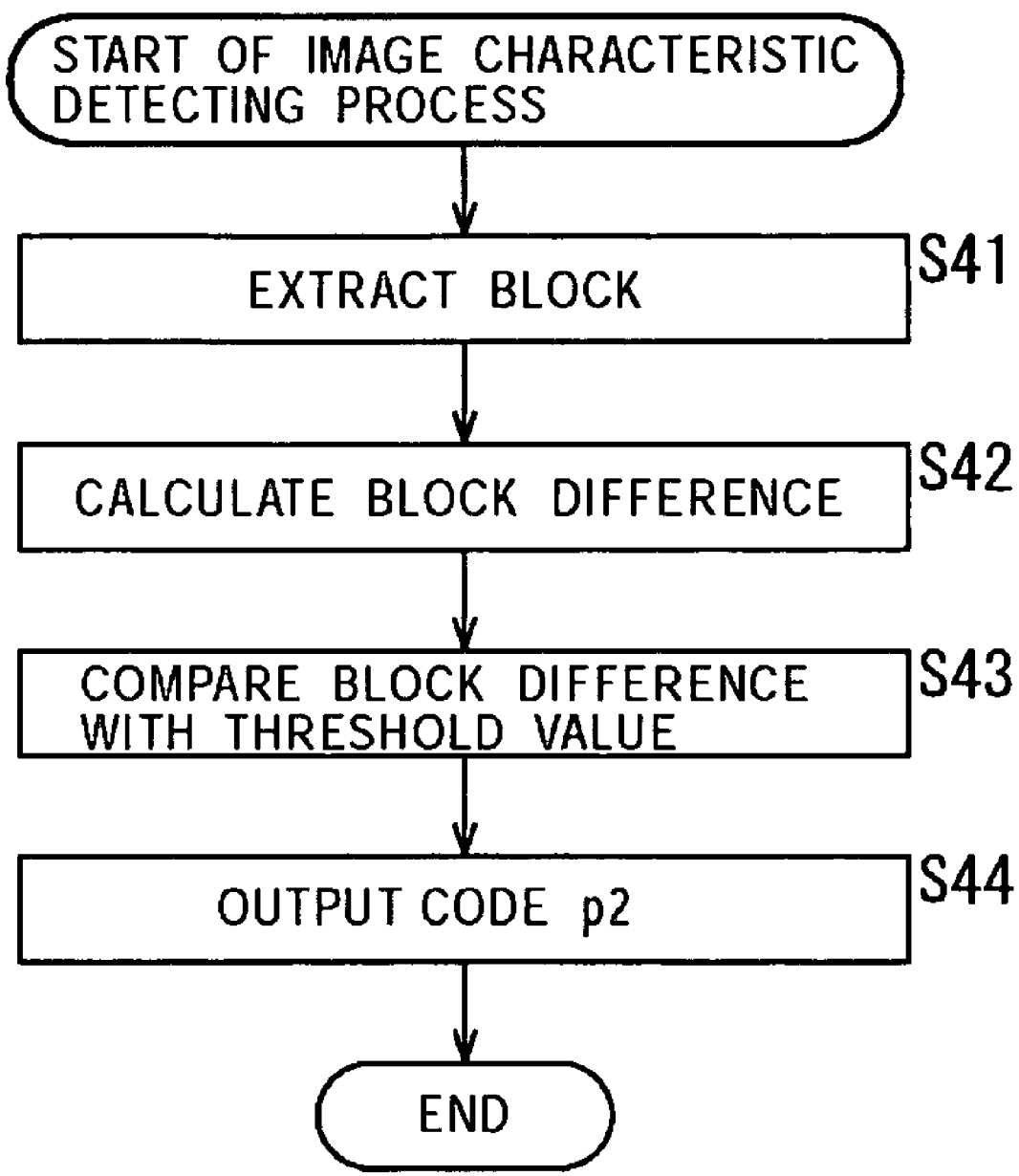
FIG. 20 is a flowchart illustrating an image characteristic detecting process.

In step S21, the image characteristic detecting unit 42 executes an image characteristic detecting process, which is described later with reference to FIG. 20. In this process, the image characteristic detecting unit 42 determines directions in which pixels with respect to a pixel of interest have flat levels. The code p2 as described above with reference to FIG. 14 is generated and output to the address calculating unit 43.

Figure 19:
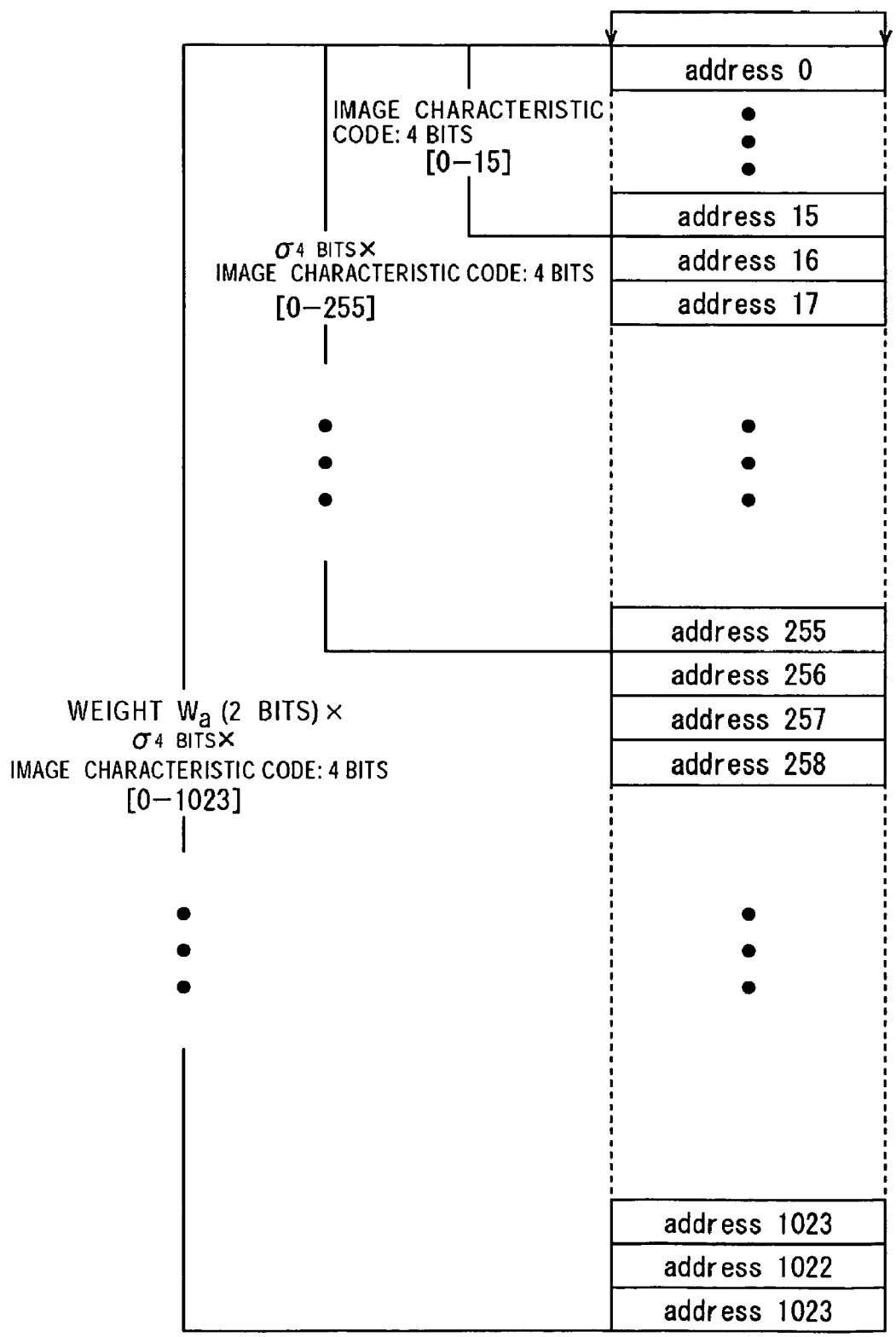
FIG. 19 is an illustration of the configuration of addresses in a coefficient ROM shown in FIG. 2.

In step S22, the address calculating unit 43 calculates an address in the coefficient ROM 44. The configuration of addresses in the coefficient ROM 44 is shown in FIG. 19. In this example, the addresses in the coefficient ROM 44 consist of four bits (the output from the image characteristic detecting unit 42) corresponding to code p2, four bits (the Control signal B in FIG. 4) representing the value of parameter σ, and two bits (the Control signal C in FIG. 4) corresponding to code p1 switching weighting functions $W_a$ in the above-described four expressions. Accordingly, there are 1024 ($2^{10}$) addresses from address 0 to address 1023. Based on the output from the image characteristic detecting unit 42, Control signal B, and Control signal C, a corresponding address is calculated by the address calculating unit 43.

In step S23, the address calculating unit 43 reads a coefficient from the coefficient ROM 44 based on the address calculated in step S22, and supplies the read address to the product-sum calculating unit 46.

In step S24, based on the coefficient read in step S23, the product-sum calculating unit 46 performs product-sum calculation for each pixel, and outputs the calculated result to the post-processing unit 47. This finds a true value from observed values, so that the blurred image is corrected.

Figure 23:
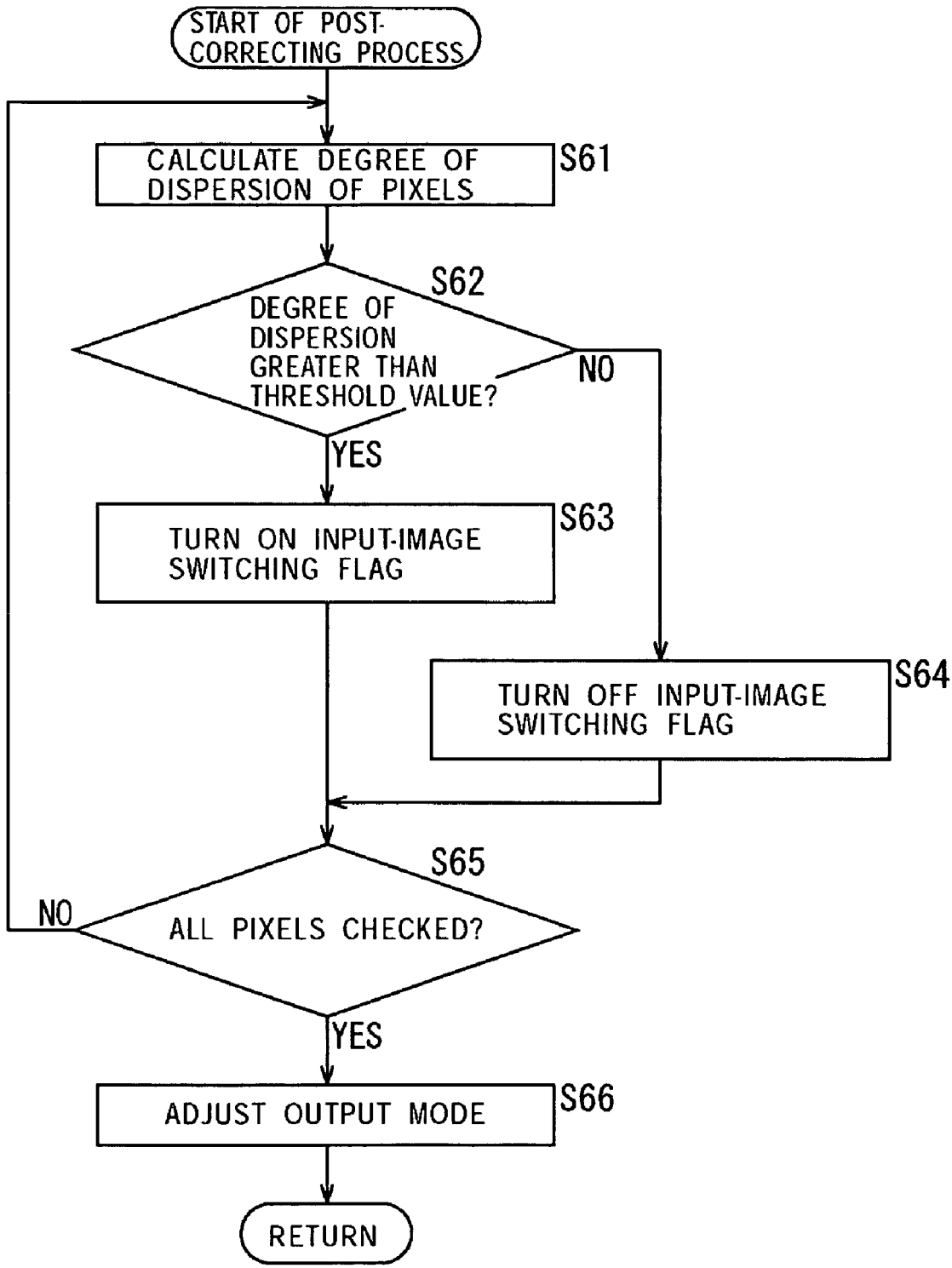
FIG. 23 is a flowchart illustrating a post-correcting process.

In step S25, the post-processing unit 47 executes a post-correcting process, which is described later with reference to FIG. 23. This process determines whether the result of processing in the product-sum calculating unit 46 is to be output for each pixel, or the input image is to be output in unchanged form. In step S26, the post-processing unit 47 outputs an image obtained by performing the post-correcting process and selection.

Figure 18:
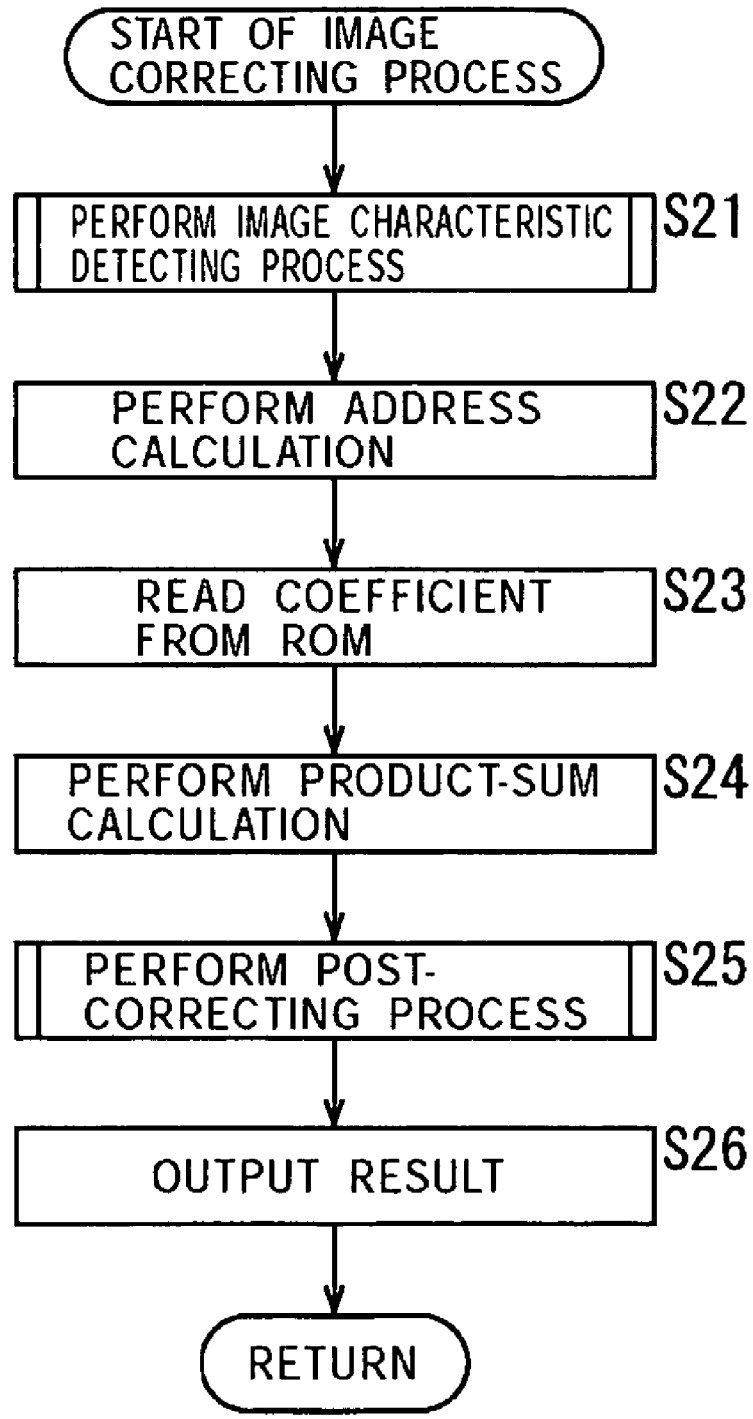
FIG. 18 is a flowchart illustrating an image correcting process.

Next, the image characteristic detecting process in the step S21 shown in FIG. 18 is described below with reference to FIG. 20.

In step S41, the image characteristic detecting unit 42 extracts each block. In step S42, a difference between blocks extracted in step S41 is calculated. Details of the calculation are described later with reference to FIG. 22. In step S43, the image characteristic detecting unit 42 compares the difference in block calculated in step S42 with a threshold value set beforehand. In step S44, based on the result of comparison, the image characteristic detecting unit 42 outputs code p2 representing a direction in which pixels with respect to the pixel of interest have flat levels.

The image characteristic detecting process is further described below with reference to FIGS. 21 and 22.

Figure 21:
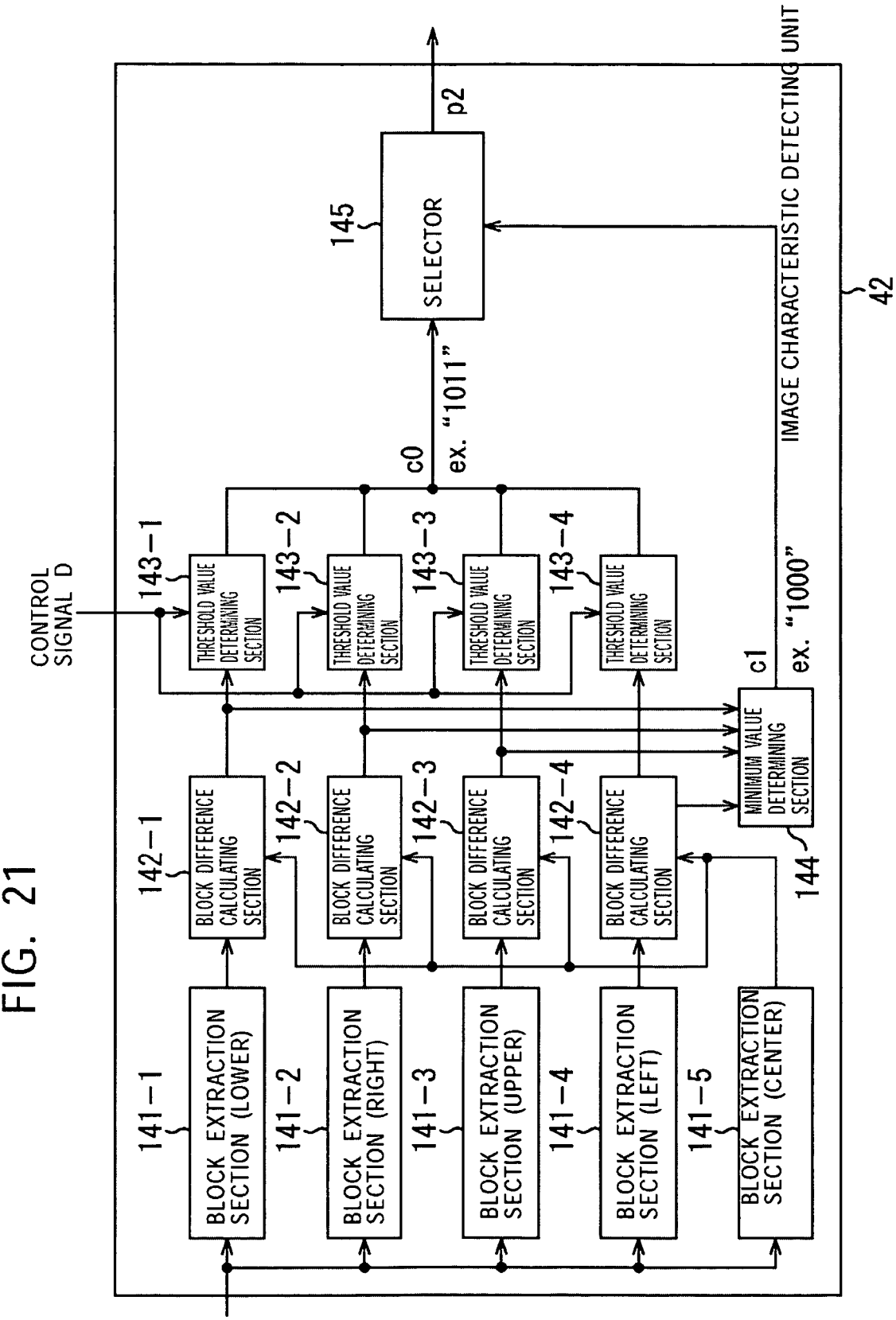
FIG. 21 is a block diagram showing an example of the image characteristic detecting unit shown in FIG. 2.

FIG. 21 is a block diagram showing an example of the image characteristic detecting unit 42. As shown on the left of FIG. 21, block extraction sections 141-1 to 141-5 for extracting predetermined blocks from the input image are provided. The block extraction sections 141-1 to 141-5 extract five blocks, each block consisting of 9 (=3×3) pixels which are positioned around a pixel of interest (pixel to be corrected) indicated by the block circle shown in, for example, each of FIGS. 22A to 22B, and which include the pixel of interest.

Figure 22A:
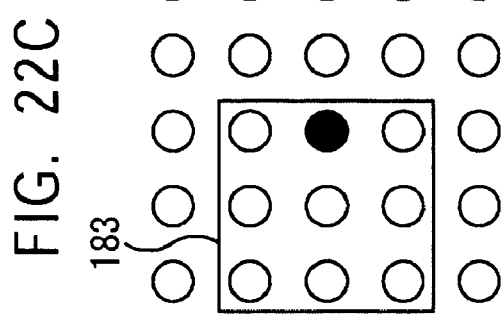
FIGS. 22A, 22B, 22C, 22D, 22E are schematic illustrations of examples of blocks detected in the image characteristic detecting process shown in FIG. 20.
Figure 22B:
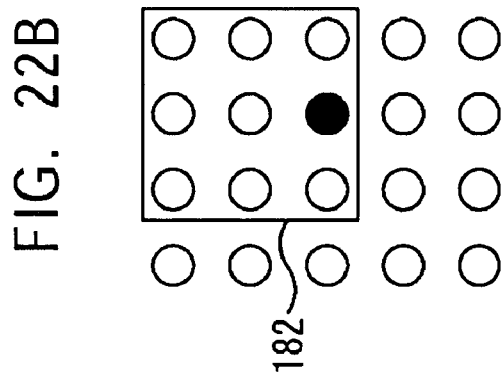
Figure 22C:
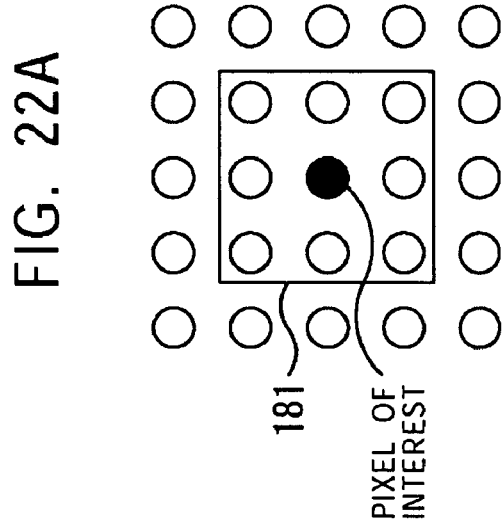

The block 181 shown in FIG. 22A is a central block including the pixel of interest in its center, and is extracted by the block extraction section 141-5. The block shown in FIG. 22B is an upper block obtained by moving the block 181 upward by one pixel, and is extracted by the block extraction section 141-3. The block 183 shown in FIG. 22C is a left block obtained by moving the block 181 left by one pixel, and is extracted by the block extraction section 141-4.

Figure 22D:
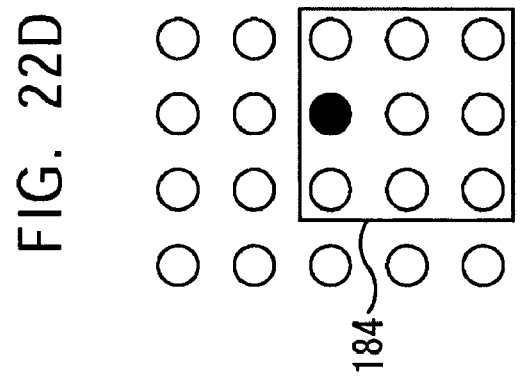
Figure 22E:
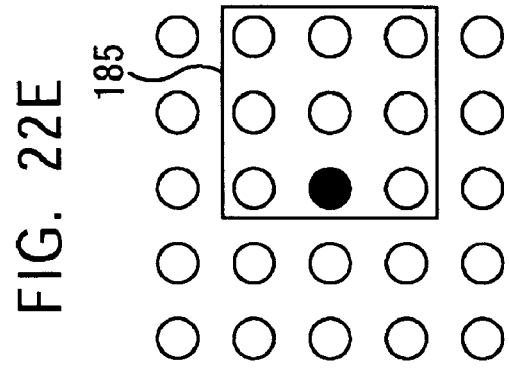

The block 184 shown in FIG. 22D is a lower block obtained by moving the block 181 downward by one pixel, and is extracted by the block extraction section 141-1. The block 185 shown in FIG. 22E is a right block obtained by moving the block 181 right by one pixel, and is extracted by the block extraction section 141-2. In step S41, five blocks 181 to 185 are extracted for each pixel of interest.

Pieces of information of pixels constituting the blocks extracted by the block extraction sections 141-1 to 141-5 are output to the block difference calculating sections 142-1 to 142-4. The block difference calculating sections 142-1 to 142-4 calculate differences in pixel in the blocks, for example, in the following manner.

Regarding the nine pixels in the block 181, the levels of three pixels in the top row are represented by a(181), b(181), and c(181) from left. The levels of three pixels in the central row are represented by d(181), e(181), and f(181) from left. The levels of three pixels in the bottom row are represented by g(181), h(181), and i(181) from left. Similarly, regarding the nine pixels in the block 184, the levels of three pixels in the top row are represented by a(184), b(184), and c(184). The levels of three pixels in the central row are represented by d(184), e(184), and f(184) from left, and the levels of three pixels in the bottom row are represented by g(184), h(184), and i(184) from left. The block difference calculating section 142-1 calculates block difference B(1), as follows:

$$B(1)=|a(181)-a(184)|+|b(181)-b(184)|+|c(181)-c(184)|+ \ldots +|i(181)-i(184)|$$

In other words, block difference B(1) is the total sum of the absolute values of pixel-level differences of the corresponding pixels between the block 181 (central block) and the block 184 (lower block). Similarly, the block difference calculating section 142-2 calculates block difference B(2) by finding the total sum of the absolute values of pixel-level differences of the corresponding pixels between the block 181 (central block) and the block 185 (right block). The block difference calculating section 142-3 calculates block difference B(3) by finding the total sum of the absolute values of pixel-level differences of the corresponding pixels between the block 181 (central block) and the block 182 (upper block). The block difference calculating section 142-4 calculates block difference B(4) by finding the total sum of the absolute values of pixel-level differences of the corresponding pixels between the block 181 (central block) and the block 183 (left block).

In step S42, as described above, block differences B(1) to B(4) representing pixel-level differences of the central block 181 from the lower block 184, the right block 185, the upper block 182, and the left block 183 are calculated. The calculated results are output to threshold value determining sections 143-1 to 143-4, respectively, and are simultaneously supplied to a minimum value determining section 144.

By comparing block differences B(1) to B(4) with a threshold value set beforehand, the threshold value determining sections 143-1 to 143-4 each determine which value is greater. This threshold value can be switched based on Control signal D. When each block difference is greater than the threshold value, each of the threshold value determining sections 143-1 to 143-4 determines that, in the corresponding direction, pixels have flat levels, and outputs "0". Conversely, when the block difference is less than the threshold value, it is determined that, in the corresponding direction, pixels have flat levels, and "1" is output.

In step S43, as described above, each block difference and the threshold value is compared. The outputs from the threshold value determining sections 143-1 to 143-4 are output as a 4-bit code to a selector 145. For example, when block differences B(1), B(3), and B(4) are less than the threshold value, and block difference B(2) is greater than the threshold value, the code "1011" is output.

In addition, it is possible that all block differences B(1) to B(4) be greater than the threshold value, that is, the pixels have no flat levels. In this case, the threshold value determining sections 143-1 to 143-4 output the code "0000". However, as is understood from FIG. 14, when code P2 is "0000", corresponding weighting functions $W_1$ to $W_4$ cannot be specified. Accordingly, the selector 145 determines whether the code output from the threshold value determining sections 143-1 to 143-4 is "0000". If the selector 145 has determined that the code output from the threshold value determining sections 143-1 to 143-4 is "0000", the selector 145 outputs, as code p2, the output of the minimum value determining section 144.

The minimum value determining section 144 determines the minimum value of block differences B(1) to B(4), and outputs, to the selector 145, a 4-bit code corresponding to the determination, at the same time that the threshold value determining sections 143-1 to 143-4 output the code. For example, when, among block differences B(1) to B(4), block difference B(1) is the minimum, the minimum value determining section 144 outputs the code "1000" to the selector 145.

This enables the code "1000" output from the minimum value determining section 144 to be output as code p2 even if the code "0000" is output from the threshold value determining sections 143-1 to 143-4. Obviously, when the code output from the threshold value determining sections 143-1 to 143-4 is not "0000", the code output from the threshold value determining sections 143-1 to 143-4 is output as code p2. In step S44, code p2 is generated in the above manner, and is output to the address calculating unit 43.

Next, the post-correcting process shown in FIG. 18 is described below with reference to FIG. 23.

In step S61, the post-processing unit 47 calculates the degree of dispersion of pixels based on the output from the product-sum calculating unit 46. This calculates the degree of dispersion of pixels around the pixel of interest. In step S62, the post-processing unit 47 determines whether the degree of dispersion calculated in step S62 is greater than a threshold value set beforehand. This threshold value is switched based on Control signal E.

If the post-processing unit 47 has determined in step S62 that the calculated degree of dispersion is greater than the threshold value, in step S63, the post-processing unit 47 turns on an input-image switching flag corresponding to the pixel of interest. Conversely, if the post-processing unit 47 has determined in step S62 that the calculated degree of dispersion is not greater than the threshold value, in step S64, the post-processing unit 47 turns off an input-image switching flag corresponding to the pixel of interest.

In the case of using the product-sum calculating unit 46 to perform product-sum calculation for pixels corresponding to an originally unblurred portion of the input image, the processed image may consequently deteriorate because the activity of image portions around the pixels increases. In this case, when the degree of dispersion of pixels is greater than the threshold value, it is determined that the pixels are in deteriorated state, and the input-image switching flag is turned on. Pixels on which the input-image switching flag is on are switched to pixels of the input image for display (in other words, the pixels are returned to be in the original state) when being output to the display device 2.

In step S65, the post-processing unit 47 determines whether all the pixels have been checked. If the post-processing unit 47 has determined that all the pixels have not been checked yet, it returns to step S61, and repeatedly executes the subsequent steps. If the post-processing unit 47 has determined in step S65 that all the pixels have been checked, in step S66, the post-processing unit 47 adjusts an output mode. The output mode is described later.

As described above, for each pixel, it is determined which is to be performed between outputting the result of the product-sum calculation and outputting the pixels of the input image in unchanged form. In this manner, the image can be prevented from consequently deteriorating due to correction of an originally unblurred portion of the input image.

The post-correcting process is further described below with reference to FIGS. 24 and 25.

Figure 24:
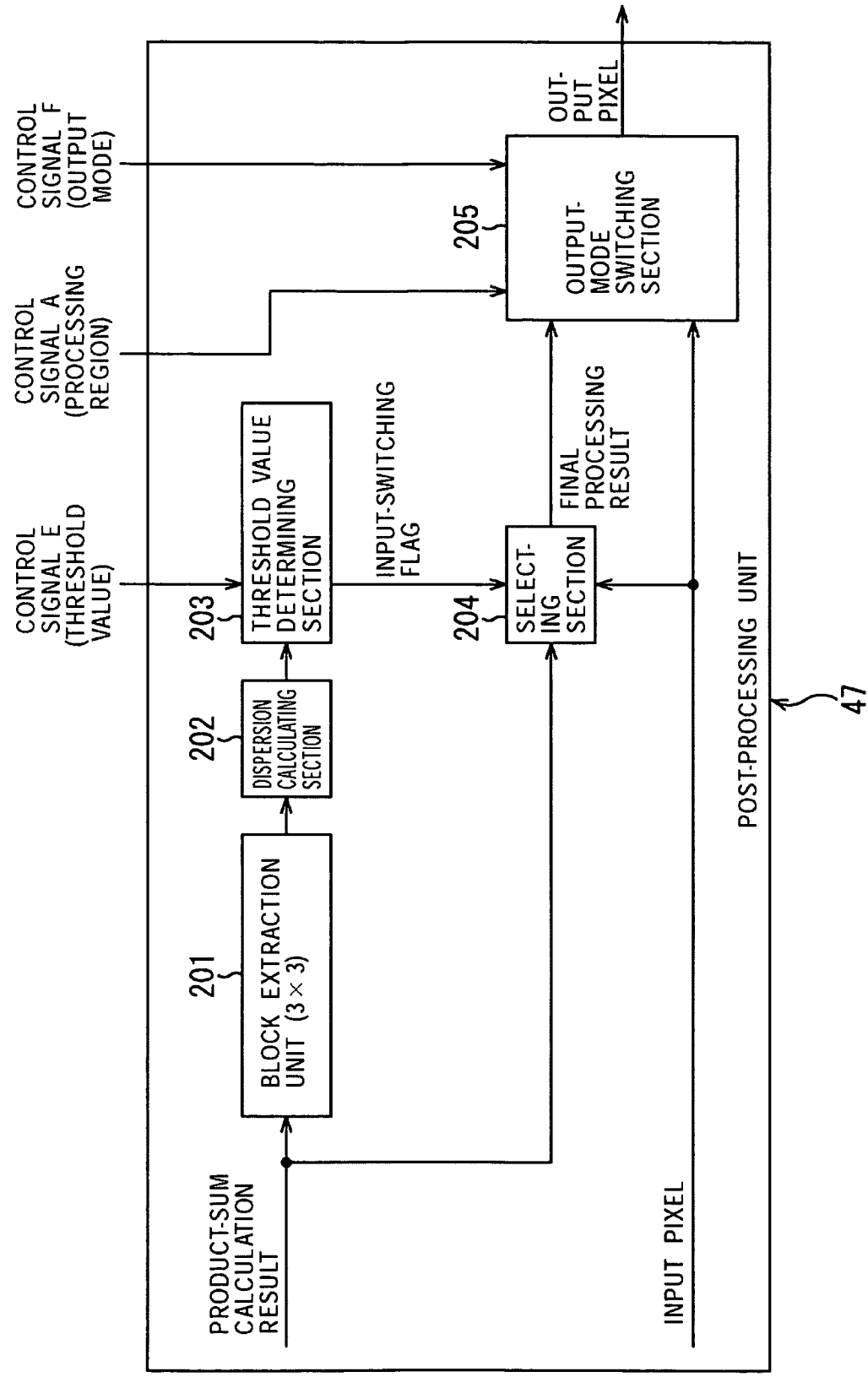
FIG. 24 is a block diagram showing an example of the post-processing unit shown in FIG. 2.
Figure 25:
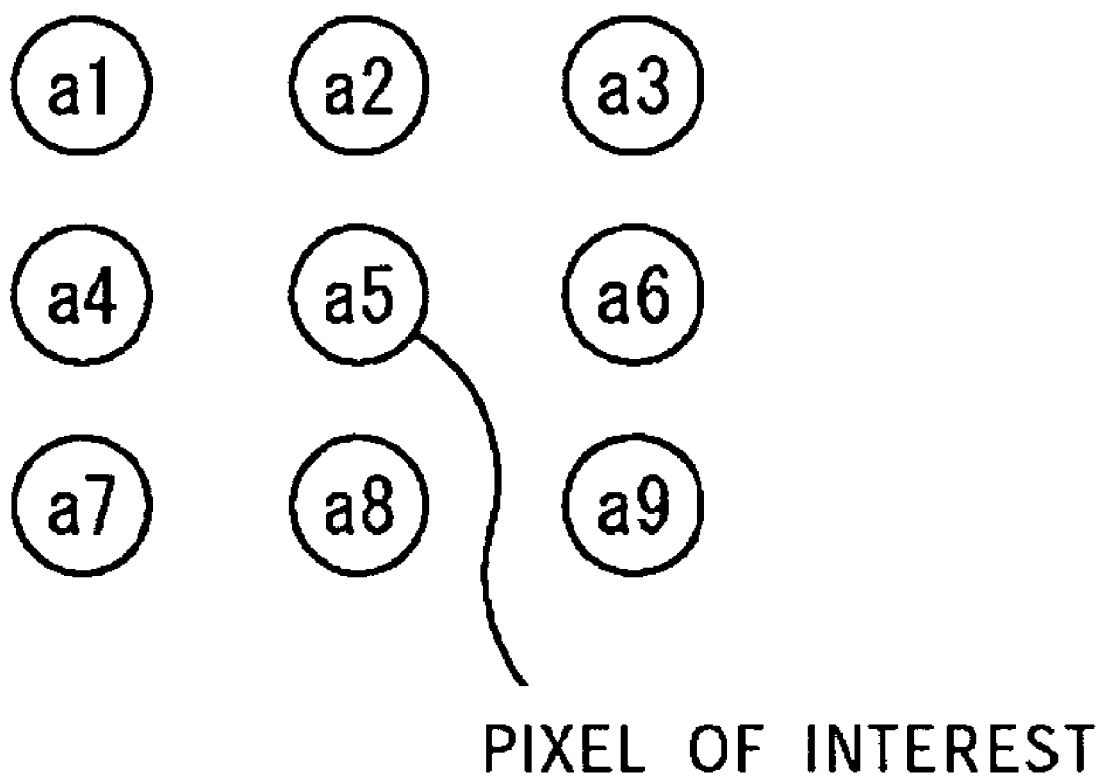
FIG. 25 is a schematic illustration of an example of a block extracted in the post-correcting process shown in FIG. 23.

FIG. 24 is a block diagram showing an example of the post-processing unit 47. The output of the product-sum calculating unit 46 is input to a block extraction unit (3×3) 201. As FIG. 25 shows, the block extraction unit (3×3) 201 extracts 9 (=3×3) pixels a1 to a9 around a pixel a5 of interest, and outputs the extracted pixels to a dispersion calculating section 202. The dispersion calculating section 202 calculates the degree of dispersion by using the following expression:

$$v = \sum_{s=1}^{g}(a^s - m)^2 \quad (12)$$

where m represents the average of the levels of nine pixels in the block, and v is the total sum of the squares of differences from the average of pixel levels, and represents the degree of dispersion of pixels in the block.

In step S61, the degree of dispersion is calculated as described above, and the calculated result is output to a threshold value determining section 203.

The threshold value determining section 203 compares the output (the degree of dispersion) of the dispersion calculating section 202 with a threshold value set based on Control signal E. If the threshold value determining section 203 has determined that the degree of dispersion is greater than the threshold value, the post-processing unit 47 controls the selecting section 204 to turn on an input-image switching flag corresponding to the pixel of interest. If the threshold value determining section 203 has determined that the degree of dispersion is not greater than the threshold value, the post-processing unit 47 controls the selecting section 204 to turn off the input-image switching flag. In steps S62 to S64, it is determined whether the degree of dispersion is greater than the threshold value. Based on the result of determination, the input-image switching flag is set.

The output of the selecting section 204 is supplied to an output-mode switching section 205. The output-mode switching section 205 detects a region to be processed in an output image on the basis of Control signal A, and outputs an image to the display device 2 after switching the output mode of the output image on the basis of Control signal F. The output-mode switching section 205 is also supplied with the pixels of the input image.

Figure 26:
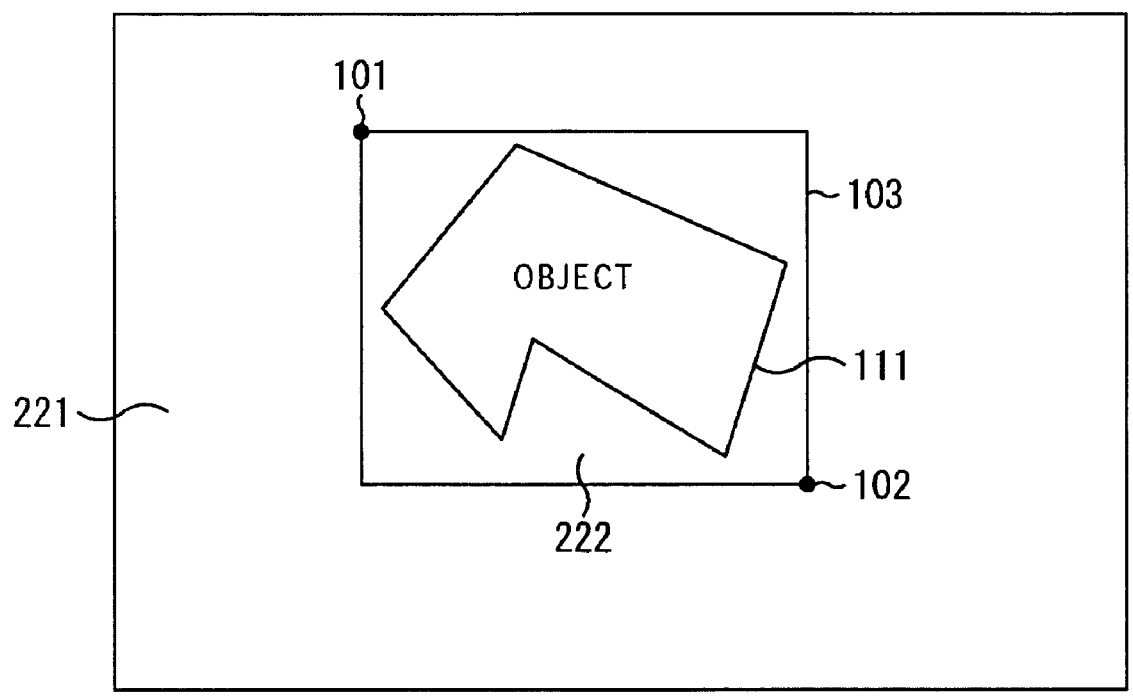
FIG. 26 is a schematic illustration of an example of an output image.

FIG. 26 shows an example of an image output after the image signal processing apparatus 1 corrects blurring in the input image shown in FIG. 17. Based on Control signal A, the output-mode switching section 205 detects positions in the output image which correspond to points 101 and 102 designated by the user 3, and detects pixels constituting a rectangular frame 103. Next, the output-mode switching section 205 detects pixels constituting a region 222 inside the frame 103 and pixels constituting a region 221 outside the frame 103.

By operating the button 67 to enable the generation of Control signal F controlling the output mode, the user 3 can switch output modes. FIG. 27 shows example types of output modes. FIG. 27 shows "In-frame Output" which switches an output mode for the pixels constituting the region 222 inside the frame 103, "Out-of-frame Output" which switches an output mode for the pixels constituting the region 221 outside the frame 103, and "Frame Output" which switches an output mode for the pixels constituting the frame 103.

When the "In-frame Output" is set to "a" as an output mode, for the pixels constituting the region 222 inside the frame 103, a final processing result, that is, the output of the selecting section 204 is output. When the "In-frame Output" is set to "b", for the pixels constituting the region 222 inside the frame 103, the pixel levels of the input image are output in unchanged form.

The "Out-of-frame Output" is set to "a" as an output mode, for the pixels constituting the region 221 outside the frame 103, uniform pixel levels are output, for example, the brightness of the pixels constituting the region 221 are output with it set to be uniform. The "Out-of-frame Output" is set to "b", for the pixels constituting the region 221 outside the frame 103, the pixel levels of the input image are output in unchanged form.

When the "Frame Output" is set to "a" as an output mode, for the pixels constituting the frame 103, for example, pixel levels representing black are output. As a result, the frame 103 is displayed in the output image. When the "Frame Output" is set to "b", for the pixels constituting the frame 103, pixel levels similarly set to those in the output mode in the "In-frame Output" or the "Out-of-frame Output" are output.

Normally, with the "In-frame Output" set "a", for the pixels constituting the region 222 inside the frame 103, the final processing result is output, that is, the blurring-corrected image is output. With the "Out-of-frame Output" set to "b", for the pixels constituting the region 221 outside the frame 103, the pixel levels of the input image are output in unchanged form. By way of example, the "In-frame Output" is switched to "b", regarding the pixels constituting the region 222 inside the frame 103, by comparison with an image formed such that the pixel levels of the input image are output in unchanged form, the amount of correction of blurring can be accurately recognized.

According to the above embodiments, image blurring can be corrected. In particular, image blurring can be appropriately corrected in accordance with image characteristics.

The above-described consecutive processing may be realized either by hardware or by software. In the case of using software to execute the above-described consecutive processing, programs constituting the software are installed from a network or a recording medium into a computer built into dedicated hardware or a multipurpose personal computer (as shown in, for example, FIG. 28) in which, by installing various programs, various functions can be executed.

Figure 28:
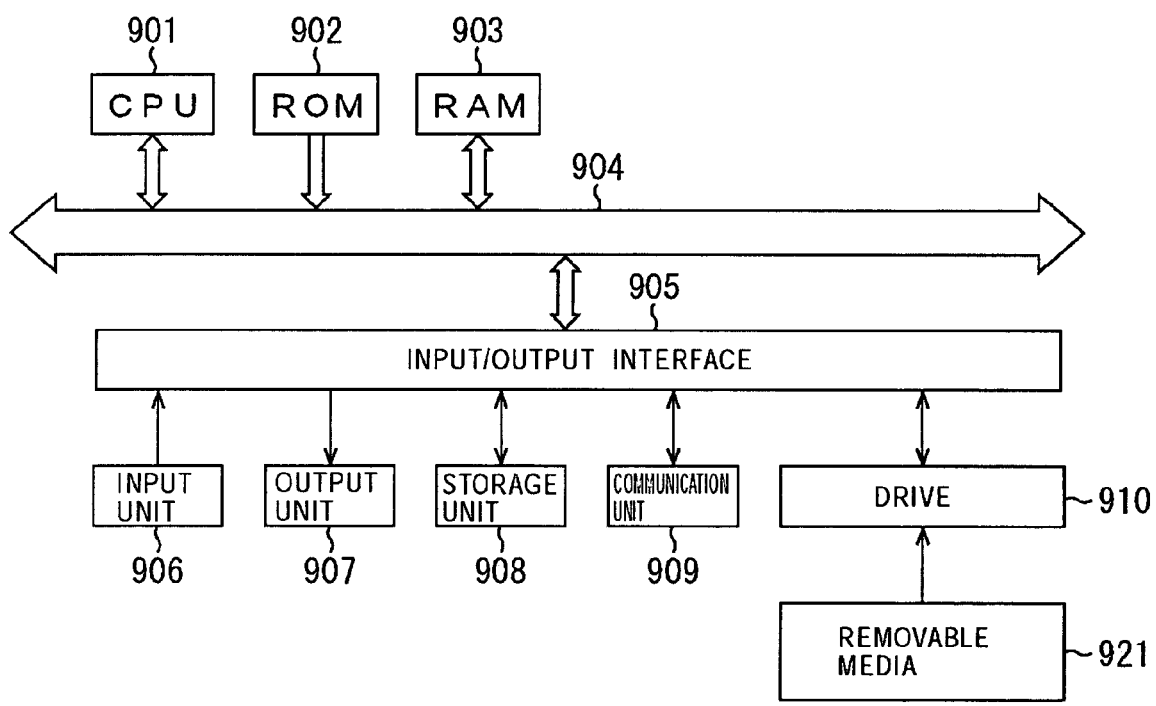
FIG. 28 is a block diagram showing an example of a personal computer.

In FIG. 28, a central processing unit (CPU) 901 executes various types of processing in accordance with programs stored in a read-only memory (ROM) 902, or programs loaded from a storage unit 908 into a random access memory (RAM) 903. The RAM 903 also stores the data required for the CPU 901 to execute various types of processing, as required.

The CPU 901, the ROM 902, and the RAM 903 are connected to one another through a bus 904. The bus 904 also connects to an input/output interface 905.

The input/output interface 905 connects to an input unit 906 composed of a keyboard, a mouse, etc., an output unit 907 composed of a cathode ray tube or a liquid crystal display, a speaker, etc., the storage unit 908, which includes a hard disk, and a communication unit 909 composed of a modem, a terminal adapter, etc. The communication unit 909 performs communicating processing.

A drive 910 is connected to the input/output interface 905, if needed. In the drive 910, for example, removable media 911 is loaded as a recording medium containing a program of the present invention. The program is read from the removable media 911 and is installed into the storage unit 908, as required.

Steps executing the above-described consecutive processing in this specification include not only steps which are implemented in a time-series manner in the order given, but also steps which are executed in parallel or separately if the steps are not always executed in a time-series manner.

The present application contains subject matter related to that described in Japanese patent application No. JP2003-291407, filed in the JPO on Aug. 11, 2003, the entire contents of which being incorporated herein by reference.

What is claimed is.

1. An image signal processing apparatus for outputting an image signal obtained by processing an input image signal, comprising:
designating means for designating a parameter representing a degree of image blurring;
detecting means for detecting an image characteristic and outputting a characteristic code representing the detected characteristic;
storage means for storing a coefficient corresponding to the parameter designated by said designating means and a coefficient corresponding to the characteristic code output by said detecting means;
reading means for reading, from said storage means, the coefficient corresponding to the parameter designated by said designating means and the coefficient corresponding to the characteristic code output by said detecting means;
calculating means for calculating new pixel levels for a plurality of pixel levels of the input image based on the coefficients read by said reading means; and
selectively-outputting means for selectively outputting, to a display, one of the new pixel levels calculated by said calculating means and the pixel levels of the input image, according to a predetermined threshold and a calculated dispersion of the new pixel levels, the calculated dispersion indicating a degree of deterioration associated with the new pixel levels.

2. An image signal processing apparatus according to claim 1, wherein, based on the coefficients read by said reading means, said calculating means performs product-sum calculation for the pixel levels of the input image.

3. An image signal processing apparatus according to claim 1, wherein said characteristic detecting means comprises.
first extracting means for extracting, from the input image, a plurality of pixels included in a first region around a pixel for which calculation is to be performed, the first region being set beforehand;
second extracting means for extracting a plurality of pixels included in the first region and a plurality of second regions consecutively positioned in vertical and horizontal directions;
block difference calculating means for calculating each of a plurality of pixel-level differences between blocks of pixels by calculating a total sum of absolute values of differences in level of corresponding pixels between the pixels extracted by said first extracting means and the pixels extracted by said second extracting means; and
difference comparing means for determining whether or not each of the calculated differences is greater than a predetermined threshold difference.

4. An image signal processing apparatus according to claim 1, wherein each of the parameters is a parameter of a Gaussian function in a model expression representing a relationship between pixels of a blurred image and pixels of an unblurred image.

5. An image signal processing apparatus according to claim 4, wherein each of the coefficients stored in said storage means is obtained by calculating an inverse matrix of the model expression.

6. An image signal processing apparatus according to claim 1, wherein said selectively-outputting means comprises:
pixel extracting means for extracting a plurality of pixels for which calculation is performed by said calculating means;
dispersion calculating means for calculating a dispersion representing the degree of dispersion of the pixels extracted by said pixel extracting means; and
dispersion comparing means for determining whether or not the dispersion calculated by said dispersion calculating means is greater than a predetermined threshold dispersion.

7. An image signal processing apparatus according to claim 6, wherein said selectively-outputting means further comprises pixel selecting means which, based on the result of determination by said dispersion comparing means, selects pixel levels to be output from the new pixel levels calculated by said calculating means and the levels of pixels of the input image.

8. An image signal processing apparatus according to claim 7, wherein:
said designating means receives a designated output mode representing a manner of displaying an image to be output; and
said selectively-outputting means further comprises switching means which, based on the output mode, performs switching to the manner of displaying the image to be output.

9. An image processing method for causing an image processing apparatus to output an image obtained by processing an input image, the image processing method comprising:
designating, in a data processor, a parameter representing a degree of image blurring;
detecting an image characteristic and outputting a characteristic code representing the detected characteristic;
reading, from among coefficients stored beforehand in an electronic memory, a coefficient corresponding to the parameter designated in the detecting step and a coefficient corresponding to the characteristic code output in the detecting step;
calculating, in the data processor, new pixel levels for the levels of pixels of the input image based on the coefficients read in the reading step; and
selectively outputting, from the image signal processing apparatus to a display, one of the new pixel levels calculated in the calculating step and the pixel levels of the input image, according to a predetermined threshold and a calculated dispersion of the new pixel levels, the calculated level of dispersion indicating a degree of deterioration associated with the new pixel levels.

10. A computer-readable medium storing computer-readable instructions thereon for an image signal processing apparatus, the computer-readable instructions when executed by a processor cause the processor to perform the steps comprising:
controlling designation of a parameter representing a degree of image blurring;
controlling the image signal processing apparatus to detect an image characteristic and to output a characteristic code representing the characteristic;
controlling reading, from among coefficients stored beforehand, a coefficient corresponding to the parameter designated in the step of controlling designation and a coefficient corresponding to the characteristic code output in the step of controlling detection;

controlling the image signal processing apparatus to calculate new pixel levels for the levels of pixels of the input image based on the coefficients read in the step of controlling the reading; and controlling the image signal processing apparatus to selectively output, to a display, one of the new pixel levels calculated in the step of controlling the calculation and the levels of pixels of the input image, according to a predetermined threshold and a calculated dispersion of the new pixel levels, the calculated dispersion indicating a degree of deterioration associated with the new pixel levels.

11. A computer-readable medium storing computer-readable instructions thereon, the instructions being used with an image signal processing apparatus for outputting an image signal obtained by processing an input image signal, the instructions when executed by a computer cause the computer to perform the steps comprising:

controlling designation of a parameter representing a degree of image blurring;

controlling the image signal processing apparatus to detect an image characteristic and to output a characteristic code representing the characteristic;

controlling reading, from among coefficients stored beforehand, a coefficient corresponding to the parameter designated in the step of controlling designation and a coefficient corresponding to the characteristic code output in the step of controlling designation;

controlling the image signal processing apparatus to calculate new pixel levels for the levels of pixels of the input image based on the coefficients read in the step of controlling the reading; and controlling the image signal processing apparatus to selectively output, to a display, one of the new pixel levels calculated in the step of controlling the calculation and the levels of pixels of the input image, in accordance with a predetermined threshold and a calculated dispersion of the new pixel levels, the calculated dispersion indicating a degree of deterioration associated with the new pixel levels.

12. An image signal processing apparatus for outputting an image signal obtained by processing an input image signal, comprising.

a designation mechanism configured to designate a parameter that represents a degree of image blurring;

a detector configured to detect an image characteristic and output a characteristic code representing a detected image characteristic;

a computer readable medium configured to store a coefficient corresponding to the parameter designated by said designation mechanism and a coefficient corresponding to the characteristic code output by said detector;

a reading mechanism configured to read from said computer readable medium the coefficient corresponding to the parameter and the coefficient corresponding to the characteristic code output by said detector;

a computing mechanism configured to calculate new pixel levels for levels of pixels of an input image based on the coefficient read by said reading mechanism; and a selective output mechanism configured to selectively output, to a display, one of the new pixel levels calculated by said computing mechanism and the levels of pixels of the input image, in accordance with a predetermined threshold and a calculated dispersion of the new pixel levels, the calculated dispersion indicating a degree of deterioration associated with the new pixel levels.

13. An image signal processing apparatus according to claim 12, wherein, based on coefficients read by said reading mechanism, said computing mechanism performs a product-sum calculation for the levels of pixels of the input image.

14. An image signal processing apparatus according to claim 12, wherein said detector comprises:

a first extraction mechanism configured to extract, from the input image, a plurality of pixels included in a first region around a pixel for which calculation is to be performed, the first region being set beforehand;

a second extraction mechanism configured to extract a plurality of pixels included in the first region and a plurality of second regions consecutively positioned in vertical and horizontal directions;

a block difference calculation mechanism configured to calculate each of a plurality of pixel-level differences between blocks of pixels by calculating a total sum of absolute values of differences in level of corresponding pixels between the pixels extracted by said first extraction mechanism and the pixels extracted by said second extraction mechanism; and a comparator configured to determine whether each of the calculated differences is greater than a predetermined threshold difference.

15. An image signal processing apparatus according to claim 12, wherein each of the parameters is a parameter of a Gaussian function in a model expression representing a relationship between pixels of a blurred image and pixels of an unblurred image.

16. An image signal processing apparatus according to claim 15, wherein each of the coefficients stored in said computer readable medium is obtained by calculating an inverse matrix of the model expression.

17. An image signal processing apparatus according to claim 12, wherein said selective output mechanism comprises:

a pixel extraction mechanism configured to extract a plurality of pixels for which calculation is performed by said computing mechanism;

a dispersion computing mechanism configured to calculate a dispersion representing a degree of dispersion of the pixels extracted by said pixel extraction mechanism; and a dispersion comparing mechanism configured to determine whether the dispersion calculated by said dispersion computing mechanism is greater than a predetermined threshold dispersion.

18. An image signal processing apparatus according to claim 17, wherein said selective output mechanism further comprises a pixel selection mechanism which, based on a determination result of said dispersion comparing mechanism, is configured to select pixel levels to be output from the pixel levels calculated by said computing mechanism and the levels of pixels of the input image.

19. An image signal processing apparatus according to claim 18, wherein:

said designation mechanism receives a designated output mode representing a manner of displaying an image to be output; and said selective output mechanism further comprises a switch which, based on an output mode, switches a display output format.

20. The image signal processing apparatus according to claim 1, wherein the selectively-outputting means outputs the pixel levels of the input image when the calculated dispersion of the new pixel levels exceeds the predetermined threshold.

* * * * *